United States Patent
Markuze et al.

(10) Patent No.: US 11,575,600 B2
(45) Date of Patent: Feb. 7, 2023

(54) TUNNEL-LESS SD-WAN

(71) Applicant: VMware, Inc., Palo Alto, CA (US)

(72) Inventors: Alex Markuze, Ramat Gan (IL); Chen Dar, Magshimim (IL); Aran Bergman, Givatayim (IL); Igor Golikov, Kfar Saba (IL); Israel Cidon, San Francisco, CA (US); Eyal Zohar, Shimshit (IL)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/103,614

(22) Filed: Nov. 24, 2020

(65) Prior Publication Data
US 2022/0166713 A1     May 26, 2022

(51) Int. Cl.
*G06F 15/16*     (2006.01)
*H04L 45/74*     (2022.01)
(Continued)

(52) U.S. Cl.
CPC .............. *H04L 45/74* (2013.01); *H04L 45/20* (2013.01); *H04L 45/38* (2013.01); *H04L 45/42* (2013.01)

(58) Field of Classification Search
CPC ......... H04L 45/74; H04L 45/20; H04L 45/38; H04L 45/42
(Continued)

(56) References Cited

U.S. PATENT DOCUMENTS 5,652,751 A    7/1997    Sharony
5,909,553 A    6/1999    Campbell et al.
(Continued)

FOREIGN PATENT DOCUMENTS

CN      1926809 A     3/2007
CN    102577270 A     7/2012
(Continued)

OTHER PUBLICATIONS

Using Path Label Routing in Wide Area Software-Defined Networks with OpenFlow Weidong Lin;Yukun Niu;Xia Zhang;Lingbo Wei; Chi Zhang 2016 International Conference on Networking and Network Applications (NaNA) (Year: 2016).*
(Continued)

*Primary Examiner* — Oscar A Louie
*Assistant Examiner* — Oluwatosin M Gidado
(74) *Attorney, Agent, or Firm* — Adeli LLP

(57) ABSTRACT

In a novel tunnel-less SD-WAN, when an ingress node of the SD-WAN receives a new packet flow, it identifies the path of the flow through the SD-WAN, and sends an initial prepended set of SD-WAN header values before the first packet for the flow to the next hop along this identified path, rather than encapsulating each packet of the flow with encapsulating tunnel headers that store SD-WAN next hop data for the flow. The prepended set of SD-WAN header values are then used to not only forward the first packet through the SD-WAN, but also to create records at each subsequent hop, which are then used to forward subsequent packets of the flow through the SD-WAN. Instead of identifying the entire packet flow, the first hop in the SD-WAN does not identify the entire path for the packet flow in some embodiments, but just identifies the next hop, as each subsequent hop in the SD-WAN has the task of identifying the next hop through the SD-WAN for the packet flow. Also, in some embodiments, each hop also creates records for the reverse flow in order to automatically forward reply packets along a reverse route.

21 Claims, 8 Drawing Sheets

(51) Int. Cl.
*H04L 45/00* (2022.01)
*H04L 45/42* (2022.01)

(58) Field of Classification Search
USPC .................................................. 709/238, 298
See application file for complete search history.

(56) References Cited

U.S. PATENT DOCUMENTS

| | | | |
|---|---|---|---|
| 6,154,465 A | 11/2000 | Pickett | |
| 6,157,648 A | 12/2000 | Voit et al. | |
| 6,201,810 B1 | 3/2001 | Masuda et al. | |
| 6,363,378 B1 | 3/2002 | Conklin et al. | |
| 6,445,682 B1 | 9/2002 | Weitz | |
| 6,744,775 B1 | 6/2004 | Beshai et al. | |
| 6,976,087 B1 | 12/2005 | Westfall et al. | |
| 7,003,481 B2 | 2/2006 | Banka et al. | |
| 7,280,476 B2 | 10/2007 | Anderson | |
| 7,313,629 B1 | 12/2007 | Nucci et al. | |
| 7,320,017 B1 | 1/2008 | Kurapati et al. | |
| 7,373,660 B1 | 5/2008 | Guichard et al. | |
| 7,581,022 B1 | 8/2009 | Griffin et al. | |
| 7,680,925 B2 | 3/2010 | Sathyanarayana et al. | |
| 7,681,236 B2 | 3/2010 | Tamura et al. | |
| 7,962,458 B2 | 6/2011 | Holenstein et al. | |
| 8,094,575 B1 | 1/2012 | Vadlakonda et al. | |
| 8,094,659 B1 | 1/2012 | Arad | |
| 8,111,692 B2 | 2/2012 | Ray | |
| 8,141,156 B1 | 3/2012 | Mao et al. | |
| 8,224,971 B1 | 7/2012 | Miller et al. | |
| 8,228,928 B2 | 7/2012 | Parandekar et al. | |
| 8,243,589 B1 | 8/2012 | Trost et al. | |
| 8,259,566 B2 | 9/2012 | Chen et al. | |
| 8,274,891 B2 | 9/2012 | Averi et al. | |
| 8,301,749 B1 | 10/2012 | Finklestein et al. | |
| 8,385,227 B1 | 2/2013 | Downey | |
| 8,566,452 B1 | 10/2013 | Goodwin et al. | |
| 8,630,291 B2 | 1/2014 | Shaffer et al. | |
| 8,661,295 B1 | 2/2014 | Khanna et al. | |
| 8,724,456 B1 | 5/2014 | Hong et al. | |
| 8,724,503 B2 | 5/2014 | Johnsson et al. | |
| 8,745,177 B1 | 6/2014 | Kazerani et al. | |
| 8,799,504 B2 | 8/2014 | Capone et al. | |
| 8,804,745 B1 | 8/2014 | Sinn | |
| 8,806,482 B1 | 8/2014 | Nagargadde et al. | |
| 8,855,071 B1 | 10/2014 | Sankaran et al. | |
| 8,856,339 B2 | 10/2014 | Mestery et al. | |
| 8,964,548 B1 | 2/2015 | Keralapura et al. | |
| 8,989,199 B1 | 3/2015 | Sella et al. | |
| 9,009,217 B1 | 4/2015 | Nagargadde et al. | |
| 9,055,000 B1 | 6/2015 | Ghosh et al. | |
| 9,060,025 B2 | 6/2015 | Xu | |
| 9,071,607 B2 | 6/2015 | Twitchell, Jr. | |
| 9,075,771 B1 | 7/2015 | Gawali et al. | |
| 9,135,037 B1 | 9/2015 | Petrescu-Prahova et al. | |
| 9,137,334 B2 | 9/2015 | Zhou | |
| 9,154,327 B1 | 10/2015 | Marino et al. | |
| 9,203,764 B2 | 12/2015 | Shirazipour et al. | |
| 9,306,949 B1 | 4/2016 | Richard et al. | |
| 9,323,561 B2 | 4/2016 | Ayala et al. | |
| 9,336,040 B2 | 5/2016 | Dong et al. | |
| 9,354,983 B1 | 5/2016 | Yenamandra et al. | |
| 9,356,943 B1 | 5/2016 | Lopilato et al. | |
| 9,379,981 B1 | 6/2016 | Zhou et al. | |
| 9,413,724 B2 | 8/2016 | Xu | |
| 9,419,878 B2 | 8/2016 | Hsiao et al. | |
| 9,432,245 B1 | 8/2016 | Sorenson et al. | |
| 9,438,566 B2 | 9/2016 | Zhang et al. | |
| 9,450,817 B1 | 9/2016 | Bahadur et al. | |
| 9,450,852 B1 | 9/2016 | Chen et al. | |
| 9,462,010 B1 | 10/2016 | Stevenson | |
| 9,467,478 B1 | 10/2016 | Khan et al. | |
| 9,485,163 B1 | 11/2016 | Fries et al. | |
| 9,521,067 B2 | 12/2016 | Michael et al. | |
| 9,525,564 B2 | 12/2016 | Lee | |
| 9,559,951 B1 | 1/2017 | Sajassi et al. | |
| 9,563,423 B1 | 2/2017 | Pittman | |
| 9,602,389 B1 | 3/2017 | Maveli et al. | |
| 9,608,917 B1 | 3/2017 | Anderson et al. | |
| 9,608,962 B1 | 3/2017 | Chang | |
| 9,621,460 B2 | 4/2017 | Mehta et al. | |
| 9,641,551 B1 | 5/2017 | Kariyanahalli | |
| 9,648,547 B1 | 5/2017 | Hart et al. | |
| 9,665,432 B2 | 5/2017 | Kruse et al. | |
| 9,686,127 B2 | 6/2017 | Ramachandran et al. | |
| 9,715,401 B2 | 7/2017 | Devine et al. | |
| 9,717,021 B2 | 7/2017 | Hughes et al. | |
| 9,722,815 B2 | 8/2017 | Mukundan et al. | |
| 9,747,249 B2 | 8/2017 | Cherian et al. | |
| 9,755,965 B1 | 9/2017 | Yadav et al. | |
| 9,787,559 B1 | 10/2017 | Schroeder | |
| 9,807,004 B2 | 10/2017 | Koley et al. | |
| 9,819,540 B1 | 11/2017 | Bahadur et al. | |
| 9,819,565 B2 | 11/2017 | Djukic et al. | |
| 9,825,822 B1 | 11/2017 | Holland | |
| 9,825,911 B1 | 11/2017 | Brandwine | |
| 9,825,992 B2 | 11/2017 | Xu | |
| 9,832,128 B1 | 11/2017 | Ashner et al. | |
| 9,832,205 B2 | 11/2017 | Santhi et al. | |
| 9,875,355 B1 | 1/2018 | Williams | |
| 9,906,401 B1 | 2/2018 | Rao | |
| 9,930,011 B1 | 3/2018 | Clemons, Jr. et al. | |
| 9,935,829 B1 | 4/2018 | Miller et al. | |
| 9,942,787 B1 | 4/2018 | Tillotson | |
| 9,996,370 B1 | 6/2018 | Khafizov et al. | |
| 10,038,601 B1 | 7/2018 | Becker et al. | |
| 10,057,183 B2 | 8/2018 | Salle et al. | |
| 10,057,294 B2 | 8/2018 | Xu | |
| 10,135,789 B2 | 11/2018 | Mayya et al. | |
| 10,142,226 B1 | 11/2018 | Wu et al. | |
| 10,178,032 B1 | 1/2019 | Freitas | |
| 10,178,037 B2 | 1/2019 | Appleby et al. | |
| 10,187,289 B1 | 1/2019 | Chen et al. | |
| 10,200,264 B2 | 2/2019 | Menon et al. | |
| 10,229,017 B1 | 3/2019 | Zou et al. | |
| 10,237,123 B2 | 3/2019 | Dubey et al. | |
| 10,250,498 B1 | 4/2019 | Bales et al. | |
| 10,263,832 B1 | 4/2019 | Ghosh | |
| 10,320,664 B2 | 6/2019 | Nainar et al. | |
| 10,320,691 B1 | 6/2019 | Matthews et al. | |
| 10,326,830 B1 | 6/2019 | Singh | |
| 10,348,767 B1 | 7/2019 | Lee et al. | |
| 10,355,989 B1 | 7/2019 | Panchal et al. | |
| 10,425,382 B2 | 9/2019 | Mayya et al. | |
| 10,454,708 B2 | 10/2019 | Mibu | |
| 10,454,714 B2 | 10/2019 | Mayya et al. | |
| 10,461,993 B2 | 10/2019 | Turabi et al. | |
| 10,498,652 B2 | 12/2019 | Mayya et al. | |
| 10,511,546 B2 | 12/2019 | Singarayan et al. | |
| 10,523,539 B2 | 12/2019 | Mayya et al. | |
| 10,550,093 B2 | 2/2020 | Ojima et al. | |
| 10,554,538 B2 | 2/2020 | Spohn et al. | |
| 10,560,431 B1 | 2/2020 | Chen et al. | |
| 10,565,464 B2 | 2/2020 | Han et al. | |
| 10,567,519 B1 | 2/2020 | Mukhopadhyaya et al. | |
| 10,574,528 B2 | 2/2020 | Mayya et al. | |
| 10,594,516 B2 | 3/2020 | Cidon et al. | |
| 10,594,659 B2 | 3/2020 | El-Moussa et al. | |
| 10,608,844 B2 | 3/2020 | Cidon et al. | |
| 10,637,889 B2 | 4/2020 | Ermagan et al. | |
| 10,666,460 B2 | 5/2020 | Cidon et al. | |
| 10,666,497 B2 | 5/2020 | Tahhan et al. | |
| 10,686,625 B2 | 6/2020 | Cidon et al. | |
| 10,693,739 B1 | 6/2020 | Naseri et al. | |
| 10,749,711 B2 | 8/2020 | Mukundan et al. | |
| 10,778,466 B2 | 9/2020 | Cidon et al. | |
| 10,778,528 B2 | 9/2020 | Mayya et al. | |
| 10,778,557 B2 | 9/2020 | Ganichev et al. | |
| 10,805,114 B2 | 10/2020 | Cidon et al. | |
| 10,805,272 B2 | 10/2020 | Mayya et al. | |
| 10,819,564 B2 | 10/2020 | Turabi et al. | |
| 10,826,775 B1 | 11/2020 | Moreno et al. | |
| 10,841,131 B2 | 11/2020 | Cidon et al. | |
| 10,911,374 B1 | 2/2021 | Kumar et al. | |
| 10,938,693 B2 | 3/2021 | Mayya et al. | |

(56) References Cited

U.S. PATENT DOCUMENTS

| | | |
|---|---|---|
| 10,951,529 B2 | 3/2021 | Duan et al. |
| 10,958,479 B2 | 3/2021 | Cidon et al. |
| 10,959,098 B2 | 3/2021 | Cidon et al. |
| 10,992,558 B1 | 4/2021 | Silva et al. |
| 10,992,568 B2 | 4/2021 | Michael et al. |
| 10,999,100 B2 | 5/2021 | Cidon et al. |
| 10,999,137 B2 | 5/2021 | Cidon et al. |
| 10,999,165 B2 | 5/2021 | Cidon et al. |
| 10,999,197 B2 | 5/2021 | Hooda et al. |
| 11,005,684 B2 | 5/2021 | Cidon |
| 11,018,995 B2 | 5/2021 | Cidon et al. |
| 11,044,190 B2 | 6/2021 | Ramaswamy et al. |
| 11,050,588 B2 | 6/2021 | Mayya et al. |
| 11,050,644 B2 | 6/2021 | Hegde et al. |
| 11,071,005 B2 | 7/2021 | Shen et al. |
| 11,089,111 B2 | 8/2021 | Markuze et al. |
| 11,095,612 B1 | 8/2021 | Oswal et al. |
| 11,102,032 B2 | 8/2021 | Cidon et al. |
| 11,108,851 B1 | 8/2021 | Kurmala et al. |
| 11,115,347 B2 | 9/2021 | Gupta et al. |
| 11,115,426 B1 | 9/2021 | Pazhyannur et al. |
| 11,115,480 B2 | 9/2021 | Markuze et al. |
| 11,121,962 B2 | 9/2021 | Michael et al. |
| 11,121,985 B2 | 9/2021 | Cidon et al. |
| 11,128,492 B2 | 9/2021 | Sethi et al. |
| 11,153,230 B2 | 10/2021 | Cidon et al. |
| 11,171,885 B2 | 11/2021 | Cidon et al. |
| 11,212,140 B2 | 12/2021 | Mukundan et al. |
| 11,212,238 B2 | 12/2021 | Cidon et al. |
| 11,223,514 B2 | 1/2022 | Mayya et al. |
| 11,245,641 B2 | 2/2022 | Ramaswamy et al. |
| 11,252,079 B2 | 2/2022 | Michael et al. |
| 11,252,105 B2 | 2/2022 | Cidon et al. |
| 11,252,106 B2 | 2/2022 | Cidon et al. |
| 11,258,728 B2 | 2/2022 | Cidon et al. |
| 11,310,170 B2 | 4/2022 | Cidon et al. |
| 11,323,307 B2 | 5/2022 | Mayya et al. |
| 11,381,474 B1 | 7/2022 | Kumar et al. |
| 2002/0085488 A1* | 7/2002 | Kobayashi ............ H04L 47/193 370/216 |
| 2002/0087716 A1 | 7/2002 | Mustafa |
| 2002/0152306 A1 | 10/2002 | Tuck |
| 2002/0198840 A1 | 12/2002 | Banka et al. |
| 2003/0061269 A1 | 3/2003 | Hathaway et al. |
| 2003/0088697 A1 | 5/2003 | Matsuhira |
| 2003/0112766 A1 | 6/2003 | Riedel et al. |
| 2003/0112808 A1 | 6/2003 | Solomon |
| 2003/0126468 A1 | 7/2003 | Markham |
| 2003/0161313 A1 | 8/2003 | Jinmei et al. |
| 2003/0189919 A1 | 10/2003 | Gupta et al. |
| 2003/0202506 A1 | 10/2003 | Perkins et al. |
| 2003/0219030 A1 | 11/2003 | Gubbi |
| 2004/0059831 A1 | 3/2004 | Chu et al. |
| 2004/0068668 A1 | 4/2004 | Lor et al. |
| 2004/0165601 A1 | 8/2004 | Liu et al. |
| 2004/0224771 A1 | 11/2004 | Chen et al. |
| 2005/0078690 A1 | 4/2005 | DeLangis |
| 2005/0149604 A1 | 7/2005 | Navada |
| 2005/0154790 A1 | 7/2005 | Nagata et al. |
| 2005/0172161 A1 | 8/2005 | Cruz et al. |
| 2005/0195754 A1 | 9/2005 | Nosella |
| 2005/0265255 A1 | 12/2005 | Kodialam et al. |
| 2006/0002291 A1 | 1/2006 | Alicherry et al. |
| 2006/0114838 A1 | 6/2006 | Mandavilli et al. |
| 2006/0171365 A1 | 8/2006 | Borella |
| 2006/0182034 A1 | 8/2006 | Klinker et al. |
| 2006/0182035 A1 | 8/2006 | Vasseur |
| 2006/0193247 A1 | 8/2006 | Naseh et al. |
| 2006/0193252 A1 | 8/2006 | Naseh et al. |
| 2007/0064604 A1 | 3/2007 | Chen et al. |
| 2007/0064702 A1 | 3/2007 | Bates et al. |
| 2007/0083727 A1 | 4/2007 | Johnston et al. |
| 2007/0091794 A1 | 4/2007 | Filsfils et al. |
| 2007/0103548 A1 | 5/2007 | Carter |
| 2007/0115812 A1 | 5/2007 | Hughes |
| 2007/0121486 A1 | 5/2007 | Guichard et al. |
| 2007/0130325 A1 | 6/2007 | Lesser |
| 2007/0162619 A1 | 7/2007 | Aloni et al. |
| 2007/0162639 A1 | 7/2007 | Chu et al. |
| 2007/0177511 A1 | 8/2007 | Das et al. |
| 2007/0237081 A1 | 10/2007 | Kodialam et al. |
| 2007/0260746 A1 | 11/2007 | Mirtorabi et al. |
| 2007/0268882 A1 | 11/2007 | Breslau et al. |
| 2008/0002670 A1 | 1/2008 | Bugenhagen et al. |
| 2008/0049621 A1 | 2/2008 | McGuire et al. |
| 2008/0055241 A1 | 3/2008 | Goldenberg et al. |
| 2008/0080509 A1 | 4/2008 | Khanna et al. |
| 2008/0095187 A1 | 4/2008 | Jung et al. |
| 2008/0117930 A1 | 5/2008 | Chakareski et al. |
| 2008/0144532 A1 | 6/2008 | Chamarajanagar et al. |
| 2008/0181116 A1 | 7/2008 | Kavanaugh et al. |
| 2008/0219276 A1 | 9/2008 | Shah |
| 2008/0240121 A1 | 10/2008 | Xiong et al. |
| 2009/0013210 A1 | 1/2009 | McIntosh et al. |
| 2009/0125617 A1 | 5/2009 | Kiessig et al. |
| 2009/0141642 A1 | 6/2009 | Sun |
| 2009/0154463 A1 | 6/2009 | Hines et al. |
| 2009/0247204 A1 | 10/2009 | Sennett et al. |
| 2009/0268605 A1 | 10/2009 | Campbell et al. |
| 2009/0274045 A1 | 11/2009 | Meier et al. |
| 2009/0276657 A1 | 11/2009 | Wetmore et al. |
| 2009/0303880 A1 | 12/2009 | Maltz et al. |
| 2010/0008361 A1 | 1/2010 | Guichard et al. |
| 2010/0017802 A1 | 1/2010 | Lojewski |
| 2010/0046532 A1 | 2/2010 | Okita |
| 2010/0061379 A1 | 3/2010 | Parandekar et al. |
| 2010/0080129 A1 | 4/2010 | Strahan et al. |
| 2010/0088440 A1 | 4/2010 | Banks et al. |
| 2010/0091782 A1 | 4/2010 | Hiscock |
| 2010/0091823 A1 | 4/2010 | Retana et al. |
| 2010/0107162 A1 | 4/2010 | Edwards et al. |
| 2010/0118727 A1 | 5/2010 | Draves et al. |
| 2010/0118886 A1 | 5/2010 | Saavedra |
| 2010/0165985 A1 | 7/2010 | Sharma et al. |
| 2010/0191884 A1 | 7/2010 | Holenstein et al. |
| 2010/0223621 A1 | 9/2010 | Joshi et al. |
| 2010/0226246 A1 | 9/2010 | Proulx |
| 2010/0290422 A1 | 11/2010 | Haigh et al. |
| 2010/0309841 A1 | 12/2010 | Conte |
| 2010/0309912 A1 | 12/2010 | Mehta et al. |
| 2010/0322255 A1 | 12/2010 | Hao et al. |
| 2010/0332657 A1 | 12/2010 | Elyashev et al. |
| 2011/0007752 A1 | 1/2011 | Silva et al. |
| 2011/0032939 A1 | 2/2011 | Nozaki et al. |
| 2011/0040814 A1 | 2/2011 | Higgins |
| 2011/0075674 A1 | 3/2011 | Li et al. |
| 2011/0107139 A1 | 5/2011 | Middlecamp et al. |
| 2011/0110370 A1 | 5/2011 | Moreno et al. |
| 2011/0141877 A1 | 6/2011 | Xu et al. |
| 2011/0142041 A1 | 6/2011 | Imai |
| 2011/0153909 A1 | 6/2011 | Dong |
| 2011/0235509 A1 | 9/2011 | Szymanski |
| 2011/0255397 A1 | 10/2011 | Kadakia et al. |
| 2012/0008630 A1 | 1/2012 | Ould-Brahim |
| 2012/0027013 A1 | 2/2012 | Napierala |
| 2012/0136697 A1 | 5/2012 | Peles et al. |
| 2012/0157068 A1 | 6/2012 | Eichen et al. |
| 2012/0173694 A1 | 7/2012 | Yan et al. |
| 2012/0173919 A1 | 7/2012 | Patel et al. |
| 2012/0182940 A1 | 7/2012 | Taleb et al. |
| 2012/0221955 A1 | 8/2012 | Raleigh et al. |
| 2012/0227093 A1 | 9/2012 | Shatzkamer et al. |
| 2012/0250682 A1 | 10/2012 | Vincent et al. |
| 2012/0250686 A1 | 10/2012 | Vincent et al. |
| 2012/0281706 A1 | 11/2012 | Agarwal et al. |
| 2012/0287818 A1 | 11/2012 | Corti et al. |
| 2012/0300615 A1 | 11/2012 | Kempf et al. |
| 2012/0307659 A1 | 12/2012 | Yamada |
| 2012/0317270 A1 | 12/2012 | Vrbaski et al. |
| 2012/0317291 A1 | 12/2012 | Wolfe |
| 2013/0019005 A1 | 1/2013 | Hui et al. |
| 2013/0021968 A1 | 1/2013 | Reznik et al. |
| 2013/0044764 A1 | 2/2013 | Casado et al. |
| 2013/0051237 A1 | 2/2013 | Ong |

(56) References Cited

U.S. PATENT DOCUMENTS

| | | |
|---|---|---|
| 2013/0051399 A1 | 2/2013 | Zhang et al. |
| 2013/0054763 A1 | 2/2013 | Merwe et al. |
| 2013/0086267 A1 | 4/2013 | Gelenbe et al. |
| 2013/0097304 A1 | 4/2013 | Asthana et al. |
| 2013/0103834 A1 | 4/2013 | Dzerve et al. |
| 2013/0117530 A1 | 5/2013 | Kim et al. |
| 2013/0124718 A1 | 5/2013 | Griffith et al. |
| 2013/0124911 A1 | 5/2013 | Griffith et al. |
| 2013/0124912 A1 | 5/2013 | Griffith et al. |
| 2013/0128889 A1 | 5/2013 | Mathur et al. |
| 2013/0142201 A1 | 6/2013 | Kim et al. |
| 2013/0170354 A1 | 7/2013 | Takashima et al. |
| 2013/0173788 A1 | 7/2013 | Song |
| 2013/0182712 A1 | 7/2013 | Aguayo et al. |
| 2013/0185729 A1 | 7/2013 | Vasic et al. |
| 2013/0191688 A1 | 7/2013 | Agarwal et al. |
| 2013/0238782 A1 | 9/2013 | Zhao et al. |
| 2013/0242718 A1 | 9/2013 | Zhang |
| 2013/0254599 A1 | 9/2013 | Katkar et al. |
| 2013/0258839 A1 | 10/2013 | Wang et al. |
| 2013/0258847 A1 | 10/2013 | Zhang et al. |
| 2013/0266015 A1 | 10/2013 | Qu et al. |
| 2013/0266019 A1 | 10/2013 | Qu et al. |
| 2013/0283364 A1 | 10/2013 | Chang et al. |
| 2013/0286846 A1 | 10/2013 | Atlas et al. |
| 2013/0297611 A1 | 11/2013 | Moritz et al. |
| 2013/0297770 A1 | 11/2013 | Zhang |
| 2013/0301469 A1 | 11/2013 | Suga |
| 2013/0301642 A1 | 11/2013 | Radhakrishnan et al. |
| 2013/0308444 A1 | 11/2013 | Sem-Jacobsen et al. |
| 2013/0315242 A1 | 11/2013 | Wang et al. |
| 2013/0315243 A1 | 11/2013 | Huang et al. |
| 2013/0329548 A1 | 12/2013 | Nakil et al. |
| 2013/0329601 A1 | 12/2013 | Yin et al. |
| 2013/0329734 A1 | 12/2013 | Chesla et al. |
| 2013/0346470 A1 | 12/2013 | Obstfeld et al. |
| 2014/0019604 A1 | 1/2014 | Twitchell, Jr. |
| 2014/0019750 A1 | 1/2014 | Dodgson et al. |
| 2014/0040975 A1 | 2/2014 | Raleigh et al. |
| 2014/0064283 A1 | 3/2014 | Balus et al. |
| 2014/0071832 A1 | 3/2014 | Johnsson et al. |
| 2014/0092907 A1 | 4/2014 | Sridhar et al. |
| 2014/0108665 A1 | 4/2014 | Arora et al. |
| 2014/0112171 A1 | 4/2014 | Pasdar |
| 2014/0115584 A1 | 4/2014 | Mudigonda et al. |
| 2014/0123135 A1 | 5/2014 | Huang et al. |
| 2014/0126418 A1 | 5/2014 | Brendel et al. |
| 2014/0156818 A1 | 6/2014 | Hunt |
| 2014/0156823 A1 | 6/2014 | Liu et al. |
| 2014/0160935 A1 | 6/2014 | Zecharia et al. |
| 2014/0164560 A1 | 6/2014 | Ko et al. |
| 2014/0164617 A1 | 6/2014 | Jalan et al. |
| 2014/0173113 A1 | 6/2014 | Vemuri et al. |
| 2014/0173331 A1 | 6/2014 | Martin et al. |
| 2014/0181824 A1 | 6/2014 | Saund et al. |
| 2014/0208317 A1 | 7/2014 | Nakagawa |
| 2014/0219135 A1 | 8/2014 | Li et al. |
| 2014/0223507 A1 | 8/2014 | Xu |
| 2014/0229210 A1 | 8/2014 | Sharifian et al. |
| 2014/0244851 A1 | 8/2014 | Lee |
| 2014/0258535 A1 | 9/2014 | Zhang |
| 2014/0269690 A1 | 9/2014 | Tu |
| 2014/0279862 A1 | 9/2014 | Dietz et al. |
| 2014/0280499 A1 | 9/2014 | Basavaiah et al. |
| 2014/0317440 A1 | 10/2014 | Biermayr et al. |
| 2014/0321277 A1 | 10/2014 | Lynn, Jr. et al. |
| 2014/0337500 A1 | 11/2014 | Lee |
| 2014/0341109 A1 | 11/2014 | Cartmell et al. |
| 2014/0372582 A1 | 12/2014 | Ghanwani et al. |
| 2015/0003240 A1 | 1/2015 | Drwiega et al. |
| 2015/0016249 A1 | 1/2015 | Mukundan et al. |
| 2015/0029864 A1 | 1/2015 | Raileanu et al. |
| 2015/0039744 A1 | 2/2015 | Niazi et al. |
| 2015/0046572 A1 | 2/2015 | Cheng et al. |
| 2015/0052247 A1 | 2/2015 | Threefoot et al. |
| 2015/0052517 A1 | 2/2015 | Raghu et al. |
| 2015/0056960 A1 | 2/2015 | Egner et al. |
| 2015/0058917 A1 | 2/2015 | Xu |
| 2015/0088942 A1 | 3/2015 | Shah |
| 2015/0089628 A1 | 3/2015 | Lang |
| 2015/0092603 A1 | 4/2015 | Aguayo et al. |
| 2015/0096011 A1 | 4/2015 | Watt |
| 2015/0124603 A1 | 5/2015 | Ketheesan et al. |
| 2015/0134777 A1 | 5/2015 | Onoue |
| 2015/0139238 A1 | 5/2015 | Pourzandi et al. |
| 2015/0146539 A1 | 5/2015 | Mehta et al. |
| 2015/0163152 A1 | 6/2015 | Li |
| 2015/0169340 A1 | 6/2015 | Haddad et al. |
| 2015/0172121 A1 | 6/2015 | Farkas et al. |
| 2015/0172169 A1 | 6/2015 | DeCusatis et al. |
| 2015/0188823 A1 | 7/2015 | Williams et al. |
| 2015/0189009 A1 | 7/2015 | Bemmel |
| 2015/0195178 A1 | 7/2015 | Bhattacharya et al. |
| 2015/0201036 A1 | 7/2015 | Nishiki et al. |
| 2015/0222543 A1 | 8/2015 | Song |
| 2015/0222638 A1 | 8/2015 | Morley |
| 2015/0236945 A1 | 8/2015 | Michael et al. |
| 2015/0236962 A1 | 8/2015 | Veres et al. |
| 2015/0244617 A1 | 8/2015 | Nakil et al. |
| 2015/0249644 A1 | 9/2015 | Xu |
| 2015/0257081 A1 | 9/2015 | Ramanujan et al. |
| 2015/0271056 A1 | 9/2015 | Chunduri et al. |
| 2015/0271104 A1 | 9/2015 | Chikkamath et al. |
| 2015/0271303 A1 | 9/2015 | Neginhal et al. |
| 2015/0281004 A1 | 10/2015 | Kakadia et al. |
| 2015/0312142 A1 | 10/2015 | Barabash et al. |
| 2015/0312760 A1 | 10/2015 | O'Toole |
| 2015/0317169 A1 | 11/2015 | Sinha et al. |
| 2015/0334025 A1 | 11/2015 | Rader |
| 2015/0334696 A1 | 11/2015 | Gu et al. |
| 2015/0341271 A1 | 11/2015 | Gomez |
| 2015/0349978 A1 | 12/2015 | Wu et al. |
| 2015/0350907 A1 | 12/2015 | Timariu et al. |
| 2015/0358236 A1 | 12/2015 | Roach et al. |
| 2015/0363221 A1 | 12/2015 | Terayama et al. |
| 2015/0363733 A1 | 12/2015 | Brown |
| 2015/0365323 A1 | 12/2015 | Duminuco et al. |
| 2015/0372943 A1 | 12/2015 | Hasan et al. |
| 2015/0372982 A1 | 12/2015 | Herle et al. |
| 2015/0381407 A1 | 12/2015 | Wang et al. |
| 2015/0381493 A1 | 12/2015 | Bansal et al. |
| 2016/0020844 A1 | 1/2016 | Hart et al. |
| 2016/0021597 A1 | 1/2016 | Hart et al. |
| 2016/0035183 A1 | 2/2016 | Buchholz et al. |
| 2016/0036924 A1 | 2/2016 | Koppolu et al. |
| 2016/0036938 A1 | 2/2016 | Aviles et al. |
| 2016/0037434 A1 | 2/2016 | Gopal et al. |
| 2016/0072669 A1 | 3/2016 | Saavedra |
| 2016/0072684 A1 | 3/2016 | Manuguri et al. |
| 2016/0080502 A1 | 3/2016 | Yadav et al. |
| 2016/0105353 A1 | 4/2016 | Cociglio |
| 2016/0105392 A1 | 4/2016 | Thakkar et al. |
| 2016/0105471 A1 | 4/2016 | Nunes et al. |
| 2016/0105488 A1 | 4/2016 | Thakkar et al. |
| 2016/0117185 A1 | 4/2016 | Fang et al. |
| 2016/0134461 A1 | 5/2016 | Sampath et al. |
| 2016/0134528 A1 | 5/2016 | Lin et al. |
| 2016/0134591 A1 | 5/2016 | Liao et al. |
| 2016/0142373 A1 | 5/2016 | Ossipov |
| 2016/0150055 A1* | 5/2016 | Choi ............... H04L 69/22 370/401 |
| 2016/0164832 A1 | 6/2016 | Bellagamba et al. |
| 2016/0164914 A1 | 6/2016 | Madhav et al. |
| 2016/0173338 A1 | 6/2016 | Wolting |
| 2016/0191363 A1 | 6/2016 | Haraszti et al. |
| 2016/0191374 A1 | 6/2016 | Singh et al. |
| 2016/0192403 A1 | 6/2016 | Gupta et al. |
| 2016/0197834 A1 | 7/2016 | Luft |
| 2016/0197835 A1 | 7/2016 | Luft |
| 2016/0198003 A1 | 7/2016 | Luft |
| 2016/0205071 A1* | 7/2016 | Cooper ............... H04L 63/0209 726/1 |
| 2016/0210209 A1 | 7/2016 | Verkaik et al. |
| 2016/0212773 A1 | 7/2016 | Kanderholm et al. |

(56) References Cited

U.S. PATENT DOCUMENTS

| | | |
|---|---|---|
| 2016/0218947 A1 | 7/2016 | Hughes et al. |
| 2016/0218951 A1 | 7/2016 | Vasseur et al. |
| 2016/0255169 A1 | 9/2016 | Kovvuri et al. |
| 2016/0261493 A1 | 9/2016 | Li |
| 2016/0261495 A1 | 9/2016 | Xia et al. |
| 2016/0261506 A1 | 9/2016 | Hegde et al. |
| 2016/0261639 A1 | 9/2016 | Xu |
| 2016/0269298 A1* | 9/2016 | Li .................... H04L 45/04 |
| 2016/0269926 A1 | 9/2016 | Sundaram |
| 2016/0285736 A1 | 9/2016 | Gu |
| 2016/0301471 A1 | 10/2016 | Kunz et al. |
| 2016/0308762 A1 | 10/2016 | Teng et al. |
| 2016/0315912 A1 | 10/2016 | Mayya et al. |
| 2016/0323377 A1 | 11/2016 | Einkauf et al. |
| 2016/0328159 A1 | 11/2016 | Coddington et al. |
| 2016/0330111 A1 | 11/2016 | Manghirmalani et al. |
| 2016/0352588 A1 | 12/2016 | Subbarayan et al. |
| 2016/0353268 A1 | 12/2016 | Senarath et al. |
| 2016/0359738 A1 | 12/2016 | Sullenberger et al. |
| 2016/0366187 A1 | 12/2016 | Kamble |
| 2016/0371153 A1 | 12/2016 | Dornemann |
| 2016/0378527 A1 | 12/2016 | Zamir |
| 2016/0380886 A1 | 12/2016 | Blair et al. |
| 2016/0380906 A1 | 12/2016 | Hodique et al. |
| 2017/0005986 A1 | 1/2017 | Bansal et al. |
| 2017/0006499 A1 | 1/2017 | Hampel et al. |
| 2017/0012870 A1 | 1/2017 | Blair et al. |
| 2017/0019428 A1 | 1/2017 | Cohn |
| 2017/0026283 A1 | 1/2017 | Williams et al. |
| 2017/0026355 A1 | 1/2017 | Mathaiyan et al. |
| 2017/0034046 A1 | 2/2017 | Cai et al. |
| 2017/0034052 A1 | 2/2017 | Chanda et al. |
| 2017/0034129 A1 | 2/2017 | Sawant et al. |
| 2017/0048296 A1 | 2/2017 | Ramalho et al. |
| 2017/0053258 A1 | 2/2017 | Carney et al. |
| 2017/0055131 A1 | 2/2017 | Kong et al. |
| 2017/0063674 A1 | 3/2017 | Maskalik et al. |
| 2017/0063782 A1 | 3/2017 | Jain et al. |
| 2017/0063794 A1 | 3/2017 | Jain et al. |
| 2017/0064005 A1 | 3/2017 | Lee |
| 2017/0075710 A1 | 3/2017 | Prasad et al. |
| 2017/0093625 A1 | 3/2017 | Pera et al. |
| 2017/0097841 A1 | 4/2017 | Chang et al. |
| 2017/0104653 A1 | 4/2017 | Badea et al. |
| 2017/0104755 A1 | 4/2017 | Arregoces et al. |
| 2017/0109212 A1 | 4/2017 | Gaurav et al. |
| 2017/0118173 A1 | 4/2017 | Arramreddy et al. |
| 2017/0123939 A1 | 5/2017 | Maheshwari et al. |
| 2017/0126516 A1 | 5/2017 | Tiagi et al. |
| 2017/0126564 A1 | 5/2017 | Mayya et al. |
| 2017/0134186 A1 | 5/2017 | Mukundan et al. |
| 2017/0134520 A1 | 5/2017 | Abbasi et al. |
| 2017/0139789 A1 | 5/2017 | Fries et al. |
| 2017/0142000 A1 | 5/2017 | Cai et al. |
| 2017/0149637 A1 | 5/2017 | Banikazemi et al. |
| 2017/0155557 A1 | 6/2017 | Desai et al. |
| 2017/0163473 A1 | 6/2017 | Sadana et al. |
| 2017/0171310 A1 | 6/2017 | Gardner |
| 2017/0180220 A1 | 6/2017 | Leckey et al. |
| 2017/0181210 A1 | 6/2017 | Nadella et al. |
| 2017/0195161 A1 | 7/2017 | Ruel et al. |
| 2017/0195169 A1 | 7/2017 | Mills et al. |
| 2017/0201585 A1 | 7/2017 | Doraiswamy et al. |
| 2017/0207976 A1 | 7/2017 | Rovner et al. |
| 2017/0214545 A1 | 7/2017 | Cheng et al. |
| 2017/0214701 A1 | 7/2017 | Hasan |
| 2017/0223117 A1 | 8/2017 | Messerli et al. |
| 2017/0237710 A1 | 8/2017 | Mayya et al. |
| 2017/0257260 A1 | 9/2017 | Govindan et al. |
| 2017/0257309 A1 | 9/2017 | Appanna |
| 2017/0264496 A1 | 9/2017 | Ao et al. |
| 2017/0279717 A1 | 9/2017 | Bethers et al. |
| 2017/0279741 A1 | 9/2017 | Elias et al. |
| 2017/0279803 A1 | 9/2017 | Desai et al. |
| 2017/0280474 A1 | 9/2017 | Vesterinen et al. |
| 2017/0288987 A1 | 10/2017 | Pasupathy et al. |
| 2017/0289002 A1 | 10/2017 | Ganguli et al. |
| 2017/0289027 A1* | 10/2017 | Ratnasingham ........ H04L 45/42 |
| 2017/0295264 A1 | 10/2017 | Touitou et al. |
| 2017/0302565 A1 | 10/2017 | Ghobadi et al. |
| 2017/0310641 A1 | 10/2017 | Jiang et al. |
| 2017/0310691 A1 | 10/2017 | Vasseur et al. |
| 2017/0317954 A1 | 11/2017 | Masurekar et al. |
| 2017/0317969 A1 | 11/2017 | Masurekar et al. |
| 2017/0317974 A1 | 11/2017 | Masurekar et al. |
| 2017/0337086 A1 | 11/2017 | Zhu et al. |
| 2017/0339054 A1 | 11/2017 | Yadav et al. |
| 2017/0339070 A1 | 11/2017 | Chang et al. |
| 2017/0364419 A1 | 12/2017 | Lo |
| 2017/0366445 A1 | 12/2017 | Nemirovsky et al. |
| 2017/0366467 A1 | 12/2017 | Martin et al. |
| 2017/0373950 A1 | 12/2017 | Szilagyi et al. |
| 2017/0374174 A1 | 12/2017 | Evens et al. |
| 2018/0006995 A1 | 1/2018 | Bickhart et al. |
| 2018/0007005 A1 | 1/2018 | Chanda et al. |
| 2018/0007123 A1 | 1/2018 | Cheng et al. |
| 2018/0013636 A1 | 1/2018 | Seetharamaiah et al. |
| 2018/0014051 A1 | 1/2018 | Phillips et al. |
| 2018/0020035 A1 | 1/2018 | Boggia et al. |
| 2018/0034668 A1 | 2/2018 | Mayya et al. |
| 2018/0041425 A1 | 2/2018 | Zhang |
| 2018/0062875 A1 | 3/2018 | Tumuluru |
| 2018/0062914 A1 | 3/2018 | Boutros et al. |
| 2018/0062917 A1 | 3/2018 | Chandrashekhar et al. |
| 2018/0063036 A1 | 3/2018 | Chandrashekhar et al. |
| 2018/0063193 A1 | 3/2018 | Chandrashekhar et al. |
| 2018/0063233 A1 | 3/2018 | Park |
| 2018/0063743 A1 | 3/2018 | Tumuluru et al. |
| 2018/0069924 A1 | 3/2018 | Tumuluru et al. |
| 2018/0074909 A1 | 3/2018 | Bishop et al. |
| 2018/0077081 A1 | 3/2018 | Lauer et al. |
| 2018/0077202 A1 | 3/2018 | Xu |
| 2018/0084081 A1 | 3/2018 | Kuchibhotla et al. |
| 2018/0097725 A1 | 4/2018 | Wood et al. |
| 2018/0114569 A1 | 4/2018 | Strachan et al. |
| 2018/0123910 A1 | 5/2018 | Fitzgibbon |
| 2018/0131608 A1 | 5/2018 | Jiang et al. |
| 2018/0131615 A1 | 5/2018 | Zhang |
| 2018/0131720 A1 | 5/2018 | Hobson et al. |
| 2018/0145899 A1 | 5/2018 | Rao |
| 2018/0159796 A1 | 6/2018 | Wang et al. |
| 2018/0159856 A1 | 6/2018 | Gujarathi |
| 2018/0167378 A1 | 6/2018 | Kostyukov et al. |
| 2018/0176073 A1 | 6/2018 | Dubey et al. |
| 2018/0176082 A1 | 6/2018 | Katz et al. |
| 2018/0176130 A1 | 6/2018 | Banerjee et al. |
| 2018/0213472 A1 | 7/2018 | Ishii et al. |
| 2018/0219765 A1 | 8/2018 | Michael et al. |
| 2018/0219766 A1 | 8/2018 | Michael et al. |
| 2018/0234300 A1 | 8/2018 | Mayya et al. |
| 2018/0248790 A1* | 8/2018 | Tan ....................... H04L 47/125 |
| 2018/0260125 A1 | 9/2018 | Botes et al. |
| 2018/0262468 A1 | 9/2018 | Kumar et al. |
| 2018/0270104 A1 | 9/2018 | Zheng et al. |
| 2018/0278541 A1 | 9/2018 | Wu et al. |
| 2018/0287907 A1 | 10/2018 | Kulshreshtha et al. |
| 2018/0295101 A1 | 10/2018 | Gehrmann |
| 2018/0295529 A1 | 10/2018 | Jen et al. |
| 2018/0302286 A1 | 10/2018 | Mayya et al. |
| 2018/0302321 A1 | 10/2018 | Manthiramoorthy et al. |
| 2018/0307851 A1 | 10/2018 | Lewis |
| 2018/0316606 A1 | 11/2018 | Sung et al. |
| 2018/0351855 A1 | 12/2018 | Sood et al. |
| 2018/0351862 A1 | 12/2018 | Jeganathan et al. |
| 2018/0351863 A1 | 12/2018 | Vairavakkalai et al. |
| 2018/0351882 A1 | 12/2018 | Jeganathan et al. |
| 2018/0367445 A1 | 12/2018 | Bajaj |
| 2018/0373558 A1 | 12/2018 | Chang et al. |
| 2018/0375744 A1 | 12/2018 | Mayya et al. |
| 2018/0375824 A1 | 12/2018 | Mayya et al. |
| 2018/0375967 A1 | 12/2018 | Pithawala et al. |
| 2019/0013883 A1 | 1/2019 | Vargas et al. |
| 2019/0014038 A1 | 1/2019 | Ritchie |
| 2019/0020588 A1 | 1/2019 | Twitchell, Jr. |

(56) References Cited

U.S. PATENT DOCUMENTS

| | | |
|---|---|---|
| 2019/0020627 A1 | 1/2019 | Yuan |
| 2019/0028378 A1 | 1/2019 | Houjyo et al. |
| 2019/0028552 A1 | 1/2019 | Johnson et al. |
| 2019/0036808 A1 | 1/2019 | Shenoy et al. |
| 2019/0036810 A1 | 1/2019 | Michael et al. |
| 2019/0036813 A1 | 1/2019 | Shenoy et al. |
| 2019/0046056 A1 | 2/2019 | Khachaturian et al. |
| 2019/0058657 A1 | 2/2019 | Chunduri et al. |
| 2019/0058709 A1 | 2/2019 | Kempf et al. |
| 2019/0068470 A1 | 2/2019 | Mirsky |
| 2019/0068493 A1 | 2/2019 | Ram et al. |
| 2019/0068500 A1 | 2/2019 | Hira |
| 2019/0075083 A1 | 3/2019 | Mayya et al. |
| 2019/0103990 A1 | 4/2019 | Cidon et al. |
| 2019/0103991 A1 | 4/2019 | Cidon et al. |
| 2019/0103992 A1 | 4/2019 | Cidon et al. |
| 2019/0103993 A1 | 4/2019 | Cidon et al. |
| 2019/0104035 A1 | 4/2019 | Cidon et al. |
| 2019/0104049 A1 | 4/2019 | Cidon et al. |
| 2019/0104050 A1 | 4/2019 | Cidon et al. |
| 2019/0104051 A1 | 4/2019 | Cidon et al. |
| 2019/0104052 A1 | 4/2019 | Cidon et al. |
| 2019/0104053 A1 | 4/2019 | Cidon et al. |
| 2019/0104063 A1 | 4/2019 | Cidon et al. |
| 2019/0104064 A1 | 4/2019 | Cidon et al. |
| 2019/0104109 A1 | 4/2019 | Cidon et al. |
| 2019/0104111 A1 | 4/2019 | Cidon et al. |
| 2019/0104413 A1 | 4/2019 | Cidon et al. |
| 2019/0109769 A1 | 4/2019 | Jain et al. |
| 2019/0132221 A1 | 5/2019 | Boutros et al. |
| 2019/0140889 A1 | 5/2019 | Mayya et al. |
| 2019/0140890 A1 | 5/2019 | Mayya et al. |
| 2019/0158371 A1 | 5/2019 | Dillon et al. |
| 2019/0158605 A1 | 5/2019 | Markuze et al. |
| 2019/0199539 A1 | 6/2019 | Deng et al. |
| 2019/0220703 A1 | 7/2019 | Prakash et al. |
| 2019/0238364 A1* | 8/2019 | Boutros .................. H04L 45/22 |
| 2019/0238446 A1 | 8/2019 | Barzik et al. |
| 2019/0238449 A1 | 8/2019 | Michael et al. |
| 2019/0238450 A1 | 8/2019 | Michael et al. |
| 2019/0238483 A1 | 8/2019 | Marichetty et al. |
| 2019/0268421 A1* | 8/2019 | Markuze ............... H04L 67/141 |
| 2019/0268973 A1 | 8/2019 | Bull et al. |
| 2019/0278631 A1 | 9/2019 | Bernat et al. |
| 2019/0280962 A1 | 9/2019 | Michael et al. |
| 2019/0280963 A1 | 9/2019 | Michael et al. |
| 2019/0280964 A1 | 9/2019 | Michael et al. |
| 2019/0306197 A1 | 10/2019 | Degioanni |
| 2019/0313907 A1 | 10/2019 | Khachaturian et al. |
| 2019/0319847 A1 | 10/2019 | Nahar et al. |
| 2019/0327109 A1* | 10/2019 | Guichard ............ H04L 12/4645 |
| 2019/0334813 A1 | 10/2019 | Raj et al. |
| 2019/0334820 A1 | 10/2019 | Zhao |
| 2019/0342219 A1 | 11/2019 | Liu et al. |
| 2019/0356736 A1 | 11/2019 | Narayanaswamy et al. |
| 2019/0364099 A1 | 11/2019 | Thakkar et al. |
| 2019/0364456 A1 | 11/2019 | Yu |
| 2019/0372888 A1 | 12/2019 | Michael et al. |
| 2019/0372889 A1 | 12/2019 | Michael et al. |
| 2019/0372890 A1 | 12/2019 | Michael et al. |
| 2019/0394081 A1 | 12/2019 | Tahhan et al. |
| 2020/0014609 A1 | 1/2020 | Hockett et al. |
| 2020/0014615 A1 | 1/2020 | Michael et al. |
| 2020/0014616 A1 | 1/2020 | Michael et al. |
| 2020/0014661 A1 | 1/2020 | Mayya et al. |
| 2020/0014663 A1 | 1/2020 | Chen et al. |
| 2020/0021514 A1 | 1/2020 | Michael et al. |
| 2020/0021515 A1 | 1/2020 | Michael et al. |
| 2020/0036624 A1 | 1/2020 | Michael et al. |
| 2020/0044943 A1 | 2/2020 | Bor-Yaliniz et al. |
| 2020/0044969 A1 | 2/2020 | Hao et al. |
| 2020/0059420 A1 | 2/2020 | Abraham |
| 2020/0059457 A1 | 2/2020 | Raza et al. |
| 2020/0059459 A1 | 2/2020 | Abraham et al. |
| 2020/0092207 A1 | 3/2020 | Sipra et al. |
| 2020/0097327 A1 | 3/2020 | Beyer et al. |
| 2020/0099659 A1 | 3/2020 | Cometto et al. |
| 2020/0106696 A1 | 4/2020 | Michael et al. |
| 2020/0106706 A1 | 4/2020 | Mayya et al. |
| 2020/0119952 A1 | 4/2020 | Mayya et al. |
| 2020/0127905 A1 | 4/2020 | Mayya et al. |
| 2020/0127911 A1 | 4/2020 | Gilson et al. |
| 2020/0153701 A1 | 5/2020 | Mohan et al. |
| 2020/0153736 A1 | 5/2020 | Liebherr et al. |
| 2020/0162407 A1 | 5/2020 | Tillotson |
| 2020/0169473 A1 | 5/2020 | Rimar et al. |
| 2020/0177503 A1 | 6/2020 | Hooda et al. |
| 2020/0177550 A1 | 6/2020 | Valluri et al. |
| 2020/0177629 A1 | 6/2020 | Hooda et al. |
| 2020/0186471 A1 | 6/2020 | Shen et al. |
| 2020/0195557 A1 | 6/2020 | Duan et al. |
| 2020/0204460 A1 | 6/2020 | Schneider et al. |
| 2020/0213212 A1 | 7/2020 | Dillon et al. |
| 2020/0213224 A1 | 7/2020 | Cheng et al. |
| 2020/0218558 A1 | 7/2020 | Sreenath et al. |
| 2020/0235990 A1 | 7/2020 | Janakiraman et al. |
| 2020/0235999 A1 | 7/2020 | Mayya et al. |
| 2020/0236046 A1 | 7/2020 | Jain et al. |
| 2020/0244721 A1 | 7/2020 | S et al. |
| 2020/0252234 A1 | 8/2020 | Ramamoorthi et al. |
| 2020/0259700 A1 | 8/2020 | Bhalla et al. |
| 2020/0267184 A1 | 8/2020 | Vera-Schockner |
| 2020/0280587 A1 | 9/2020 | Janakiraman et al. |
| 2020/0287819 A1 | 9/2020 | Theogaraj et al. |
| 2020/0287976 A1 | 9/2020 | Theogaraj et al. |
| 2020/0296011 A1 | 9/2020 | Jain et al. |
| 2020/0296026 A1 | 9/2020 | Michael et al. |
| 2020/0314006 A1 | 10/2020 | Mackie et al. |
| 2020/0314614 A1 | 10/2020 | Moustafa et al. |
| 2020/0322230 A1 | 10/2020 | Natal et al. |
| 2020/0322287 A1 | 10/2020 | Connor et al. |
| 2020/0336336 A1 | 10/2020 | Sethi et al. |
| 2020/0344143 A1 | 10/2020 | Faseela et al. |
| 2020/0344163 A1 | 10/2020 | Gupta et al. |
| 2020/0351188 A1 | 11/2020 | Arora et al. |
| 2020/0358878 A1 | 11/2020 | Bansal et al. |
| 2020/0366530 A1 | 11/2020 | Mukundan et al. |
| 2020/0366562 A1 | 11/2020 | Mayya et al. |
| 2020/0382345 A1 | 12/2020 | Zhao et al. |
| 2020/0382387 A1 | 12/2020 | Pasupathy et al. |
| 2020/0412576 A1* | 12/2020 | Kondapavuluru .. H04L 63/0435 |
| 2020/0413283 A1 | 12/2020 | Shen et al. |
| 2021/0006482 A1 | 1/2021 | Hwang et al. |
| 2021/0006490 A1 | 1/2021 | Michael et al. |
| 2021/0029019 A1 | 1/2021 | Kottapalli |
| 2021/0029088 A1 | 1/2021 | Mayya et al. |
| 2021/0036888 A1 | 2/2021 | Makkalla et al. |
| 2021/0036987 A1 | 2/2021 | Mishra et al. |
| 2021/0067372 A1 | 3/2021 | Cidon et al. |
| 2021/0067373 A1 | 3/2021 | Cidon et al. |
| 2021/0067374 A1 | 3/2021 | Cidon et al. |
| 2021/0067375 A1 | 3/2021 | Cidon et al. |
| 2021/0067407 A1 | 3/2021 | Cidon et al. |
| 2021/0067427 A1 | 3/2021 | Cidon et al. |
| 2021/0067442 A1 | 3/2021 | Sundararajan et al. |
| 2021/0067461 A1 | 3/2021 | Cidon et al. |
| 2021/0067464 A1 | 3/2021 | Cidon et al. |
| 2021/0067467 A1 | 3/2021 | Cidon et al. |
| 2021/0067468 A1 | 3/2021 | Cidon et al. |
| 2021/0092062 A1 | 3/2021 | Dhanabalan et al. |
| 2021/0105199 A1 | 4/2021 | H et al. |
| 2021/0112034 A1 | 4/2021 | Sundararajan et al. |
| 2021/0126830 A1 | 4/2021 | R. et al. |
| 2021/0126853 A1 | 4/2021 | Ramaswamy et al. |
| 2021/0126854 A1 | 4/2021 | Guo et al. |
| 2021/0126860 A1 | 4/2021 | Ramaswamy et al. |
| 2021/0144091 A1 | 5/2021 | H et al. |
| 2021/0160169 A1 | 5/2021 | Shen et al. |
| 2021/0160813 A1 | 5/2021 | Gupta et al. |
| 2021/0176255 A1* | 6/2021 | Hill ........................ H04L 63/04 |
| 2021/0184952 A1 | 6/2021 | Mayya et al. |
| 2021/0184966 A1 | 6/2021 | Ramaswamy et al. |
| 2021/0184983 A1 | 6/2021 | Ramaswamy et al. |
| 2021/0194814 A1 | 6/2021 | Roux et al. |

(56) References Cited

U.S. PATENT DOCUMENTS

| | | |
|---|---|---|
| 2021/0226880 A1 | 7/2021 | Ramamoorthy et al. |
| 2021/0234728 A1 | 7/2021 | Cidon et al. |
| 2021/0234775 A1 | 7/2021 | Devadoss et al. |
| 2021/0234786 A1 | 7/2021 | Devadoss et al. |
| 2021/0234804 A1 | 7/2021 | Devadoss et al. |
| 2021/0234805 A1 | 7/2021 | Devadoss et al. |
| 2021/0235312 A1 | 7/2021 | Devadoss et al. |
| 2021/0235313 A1 | 7/2021 | Devadoss et al. |
| 2021/0266262 A1 | 8/2021 | Subramanian et al. |
| 2021/0279069 A1 | 9/2021 | Salgaonkar et al. |
| 2021/0314289 A1 | 10/2021 | Chandrashekhar et al. |
| 2021/0328835 A1 | 10/2021 | Mayya et al. |
| 2021/0336880 A1 | 10/2021 | Gupta et al. |
| 2021/0377109 A1 | 12/2021 | Shrivastava et al. |
| 2021/0377156 A1 | 12/2021 | Michael et al. |
| 2021/0392060 A1 | 12/2021 | Silva et al. |
| 2021/0392070 A1 | 12/2021 | Tootaghaj et al. |
| 2021/0399920 A1 | 12/2021 | Sundararajan et al. |
| 2021/0399978 A9 | 12/2021 | Michael et al. |
| 2021/0400113 A1 | 12/2021 | Markuze et al. |
| 2021/0409277 A1 | 12/2021 | Jeuk et al. |
| 2022/0006726 A1 | 1/2022 | Michael et al. |
| 2022/0006751 A1 | 1/2022 | Ramaswamy et al. |
| 2022/0006756 A1 | 1/2022 | Ramaswamy et al. |
| 2022/0035673 A1 | 2/2022 | Markuze et al. |
| 2022/0038370 A1 | 2/2022 | Vasseur et al. |
| 2022/0038557 A1 | 2/2022 | Markuze et al. |
| 2022/0094644 A1 | 3/2022 | Cidon et al. |
| 2022/0123961 A1 | 4/2022 | Mukundan et al. |
| 2022/0131740 A1 | 4/2022 | Mayya et al. |
| 2022/0131807 A1 | 4/2022 | Srinivas et al. |

FOREIGN PATENT DOCUMENTS

| | | | |
|---|---|---|---|
| CN | 102811165 A | 12/2012 | |
| CN | 104956329 A | 9/2015 | |
| CN | 106656847 A | 5/2017 | |
| CN | 110447209 A | 11/2019 | |
| CN | 111198764 A | 5/2020 | |
| EP | 1912381 A1 | 4/2008 | |
| EP | 3041178 A1 | 7/2016 | |
| EP | 3509256 A1 | 7/2019 | |
| JP | 2010233126 A | 10/2010 | |
| JP | 2017059991 A | 3/2017 | |
| RU | 2574350 C2 | 2/2016 | |
| WO | 03073701 | 9/2003 | |
| WO | 2007016834 A1 | 2/2007 | |
| WO | 2012167184 A2 | 12/2012 | |
| WO | WO-2015092565 A1 * | 6/2015 | ............. H04L 45/38 |
| WO | 2016061546 A1 | 4/2016 | |
| WO | WO-2016123314 A1 * | 8/2016 | |
| WO | 2017083975 A1 | 5/2017 | |
| WO | 2019070611 A1 | 4/2019 | |
| WO | 2019094522 A1 | 5/2019 | |
| WO | 2020018704 A1 | 1/2020 | |
| WO | WO-2020012491 A1 * | 1/2020 | ......... H04L 12/4633 |
| WO | 2020091777 A1 | 5/2020 | |
| WO | 2020101922 A1 | 5/2020 | |
| WO | 2020112345 A1 | 6/2020 | |
| WO | 2021040934 A1 | 3/2021 | |
| WO | 2021118717 A1 | 6/2021 | |
| WO | 2021150465 A1 | 7/2021 | |
| WO | 2021211906 A1 | 10/2021 | |
| WO | 2022005607 A1 | 1/2022 | |

OTHER PUBLICATIONS

End-to-End Header Compression over Software-Defined Networks: A Low Latency Network Architecture Supalerk Jivorasetkul;Masayoshi Shimamura;Katsuyoshi Iida 2012 Fourth International Conference on Intelligent Networking and Collaborative Systems Year: 2012 | Conference Paper | Publisher: IEEE (Year: 2012).*

Dynamic On-Demand Virtual Extensible LAN Tunnels via Software-Defined Wide Area Networks Gieorgi Zakurdaev;Mohammed Ismail;Chung-Horng Lung 2022 IEEE 12th Annual Computing and Communication Workshop and Conference (CCWC) Year: 2022 | Conference Paper | Publisher: IEEE (Year: 2022).*

Del Piccolo, Valentin, et al., "A Survey of Network Isolation Solutions for Multi-Tenant Data Centers," IEEE Communications Society, Apr. 20, 2016, vol. 18, No. 4, 37 pages, IEEE.

Fortz, Bernard, et al., "Internet Traffic Engineering by Optimizing OSPF Weights," Proceedings IEEE INFOCOM 2000, Conference on Computer Communications, Nineteenth Annual Joint Conference of the IEEE Computer and Communications Societies, Mar. 26-30, 2000, 11 pages, IEEE, Tel Aviv, Israel, Israel.

Francois, Frederic, et al., "Optimizing Secure SDN-enabled Inter-Data Centre Overlay Networks through Cognitive Routing," 2016 IEEE 24th International Symposium on Modeling, Analysis and Simulation of Computer and Telecommunication Systems (MAS-COTS), Sep. 19-21, 2016, 10 pages, IEEE, London, UK.

Michael, Nithin, et al., "HALO: Hop-by-Hop Adaptive Link-State Optimal Routing," IEEE/ACM Transactions on Networking, Dec. 2015, 14 pages, vol. 23, No. 6, IEEE.

Mishra, Mayank, et al., "Managing Network Reservation for Tenants in Oversubscribed Clouds," 2013 IEEE 21st International Symposium on Modelling, Analysis and Simulation of Computer and Telecommunication Systems, Aug. 14-16, 2013, 10 pages, IEEE, San Francisco, CA, USA.

Mudigonda, Jayaram, et al., "NetLord: A Scalable Multi-Tenant Network Architecture for Virtualized Datacenters," Proceedings of the ACM SIGCOMM 2011 Conference, Aug. 15-19, 2011, 12 pages, ACM, Toronto, Canada.

Non-Published Commonly Owned U.S. Appl. No. 16/662,363, filed Oct. 24, 2019, 129 pages, VMware, Inc.

Non-Published Commonly Owned U.S. Appl. No. 16/662,379, filed Oct. 24, 2019, 123 pages, VMware, Inc.

Non-Published Commonly Owned U.S. Appl. No. 16/662,402, filed Oct. 24, 2019, 128 pages, VMware, Inc.

Non-Published Commonly Owned U.S. Appl. No. 16/662,427, filed Oct. 24, 2019, 165 pages, VMware, Inc.

Non-Published Commonly Owned U.S. Appl. No. 16/662,489, filed Oct. 24, 2019, 165 pages, VMware, Inc.

Non-Published Commonly Owned U.S. Appl. No. 16/662,510, filed Oct. 24, 2019, 165 pages, VMware, Inc.

Non-Published Commonly Owned U.S. Appl. No. 16/662,531, filed Oct. 24, 2019, 135 pages, VMware, Inc.

Non-Published Commonly Owned U.S. Appl. No. 16/662,570, filed Oct. 24, 2019, 141 pages, VMware, Inc.

Non-Published Commonly Owned U.S. Appl. No. 16/662,587, filed Oct. 24, 2019, 145 pages, VMware, Inc.

Non-Published Commonly Owned U.S. Appl. No. 16/662,591, filed Oct. 24, 2019, 130 pages, VMware, Inc.

Non-Published Commonly Owned U.S. Appl. No. 16/721,964, filed Dec. 20, 2019, 39 pages, VMware, Inc.

Non-Published Commonly Owned U.S. Appl. No. 16/721,965, filed Dec. 20, 2019, 39 pages, VMware, Inc.

Non-Published Commonly Owned U.S. Appl. No. 16/792,908, filed Feb. 18, 2020, 48 pages, VMware, Inc.

Non-Published Commonly Owned U.S. Appl. No. 16/792,909, filed Feb. 18, 2020, 49 pages, VMware, Inc.

Non-Published Commonly Owned U.S. Appl. No. 16/851,294, filed Apr. 17, 2020, 59 pages, VMware, Inc.

Non-Published Commonly Owned U.S. Appl. No. 16/851,301, filed Apr. 17, 2020, 59 pages, VMware, Inc.

Non-Published Commonly Owned U.S. Appl. No. 16/851,308, filed Apr. 17, 2020, 59 pages, VMware, Inc.

Non-Published Commonly Owned U.S. Appl. No. 16/851,314, filed Apr. 17, 2020, 59 pages, VMware, Inc.

Non-Published Commonly Owned U.S. Appl. No. 16/851,323, filed Apr. 17, 2020, 59 pages, VMware, Inc.

Non-Published Commonly Owned U.S. Appl. No. 16/851,397, filed Apr. 17, 2020, 59 pages, VMware, Inc.

Non-Published Commonly Owned U.S. Appl. No. 17/068,603, filed Oct. 12, 2020, 37 pages, Nicira, Inc.

(56) References Cited

OTHER PUBLICATIONS

Non-Published Commonly Owned U.S. Appl. No. 17/072,764, filed Oct. 16, 2020, 33 pages, VMware, Inc.
Non-Published Commonly Owned U.S. Appl. No. 17/072,774, filed Oct. 16, 2020, 34 pages, VMware, Inc.
Non-Published Commonly Owned U.S. Appl. No. 17/085,893, filed Oct. 30, 2020, 34 pages, VMware, Inc.
Non-Published Commonly Owned U.S. Appl. No. 17/085,916, filed Oct. 30, 2020, 35 pages, VMware, Inc.
Non-Published Commonly Owned U.S. Appl. No. 15/803,964, filed Nov. 6, 2017, 15 pages. The Mode Group.
Non-Published Commonly Owned U.S. Appl. No. 16/216,235, filed Dec. 11, 2018, 19 pages. The Mode Group.
Ray, Saikat, et al., "Always Acyclic Distributed Path Computation," University of Pennsylvania Department of Electrical and Systems Engineering Technical Report, May 2008, 16 pages, University of Pennsylvania ScholarlyCommons.
Webb, Kevin C., et al., "Blender: Upgrading Tenant-Based Data Center Networking," 2014 ACM/IEEE Symposium on Architectures for Networking and Communications Systems (ANCS), Oct. 20-21, 2014, 11 pages, IEEE, Marina del Rey, CA, USA.
Yap, Kok-Kiong, et al., "Taking the Edge off with Espresso: Scale, Reliability and Programmability for Global Internet Peering," SIGCOMM '17: Proceedings of the Conference of the ACM Special Interest Group on Data Communication, Aug. 21-25, 2017, 14 pages, Los Angeles, CA.
Huang, Cancan, et al., "Modification of Q.SD-WAN," Rapporteur Group Meeting—Doc, Study Period 2017-2020, Q4/11-DOC1 (190410), Study Group 11, Apr. 10, 2019, 19 pages, International Telecommunication Union, Geneva, Switzerland.
Non-published Commonly Owned U.S. Appl. No. 17/187,913, filed Mar. 1, 2021, 27 pages, Nicira, Inc.
Non-Published Commonly Owned U.S. Appl. No. 17/233,427, filed Apr. 16, 2021, 124 pages, VMware, Inc.
Non-Published Commonly Owned U.S. Appl. No. 17/361,292, filed Jun. 28, 2021, 35 pages, Nicira, Inc.
Sarhan, Soliman Abd Elmonsef, et al., "Data Inspection in SDN Network," 2018 13th International Conference on Computer Engineering and Systems (ICCES), Dec. 18-19, 2018, 6 pages, IEEE, Cairo, Egypt.
Xie, Junfeng, et al., A Survey of Machine Learning Techniques Applied to Software Defined Networking (SDN): Research Issues and Challenges, IEEE Communications Surveys & Tutorials, Aug. 23, 2018, 38 pages, vol. 21, Issue 1, IEEE.
Alsaeedi, Mohammed, et al., "Toward Adaptive and Scalable OpenFlow-SDN Flow Control: A Survey," IEEE Access, Aug. 1, 2019, 34 pages, vol. 7, IEEE, retrieved from https://ieeexplore.ieee.org/document/8784036.
Long, Feng, "Research and Application of Cloud Storage Technology in University Information Service," Chinese Excellent Masters' Theses Full-text Database, Mar. 2013, 72 pages, China Academic Journals Electronic Publishing House, China.
Non-Published Commonly Owned U.S. Appl. No. 17/562,8902, filed Dec. 27, 2021, 36 pages, Nicira, Inc.
Non-Published Commonly Owned U.S. Appl. No. 17/572,583, filed Jan. 10, 2022, 33 pages, Micira, Inc.
Noormohammadpour, Mohammad, et al., "DCRoute: Speeding up Inter-Datacenter Traffic Allocation while Guaranteeing Deadlines," 2016 IEEE 23rd International Conference on High Performance Computing (HiPC), Dec. 19-22, 2016, 9 pages, IEEE, Hyderabad, India.
Guo, Xiangyi, et al., (U.S. Appl. No. 62/925,193) filed Oct. 23, 2019, 26 pages.
Lasserre, Marc, et al., "Framework for Data Center (DC) Network Virtualization," RFC 7365, Oct. 2014, 26 pages, IETF.
Non-Published Commonly Owned U.S. Appl. No. 17/467,378, filed Sep. 6, 2021, 157 pages, VMware, Inc.
Non-Published Commonly Owned U.S. Appl. No. 17/474,034, filed Sep. 13, 2021, 349 pages, VMware, Inc.
Non-Published Commonly Owned U.S. Appl. No. 17/542,413, filed Dec. 4, 2021, 173 pages, VMware, Inc.
Alvizu, Rodolfo, et al., "SDN-Based Network Orchestration for New Dynamic Enterprise Networking Services," 2017 19th International Conference on Transparent Optical Networks, Jul. 2-6, 2017, 4 pages, IEEE, Girona, Spain.
Barozet, Jean-Marc, "Cisco SD-WAN as a Managed Service," BRKRST-2558, Jan. 27-31, 2020, 98 pages, Cisco, Barcelona, Spain, retrieved from https://www.ciscolive.com/c/dam/r/ciscolive/emea/docs/2020/pdf/BRKRST-2558.pdf.
Barozei, Jean-Marc, "Cisco SDWAN," Deep Dive, Dec. 2017, 185 pages, Cisco, Retreived from https://www.coursehero.com/file/71671376/Cisco-SDWAN-Deep-Divepdf/.
Bertaux, Lionel, et al., "Software Defined Networking and Virtualization for Broadband Satellite Networks," IEEE Communications Magazine, Mar. 18, 2015, 7 pages, vol. 53, IEEE, retrieved from https://ieeexplore.ieee.org/document/7060482.
Cox, Jacob H., et al., "Advancing Software-Defined Networks: A Survey," IEEE Access, Oct. 12, 2017, 40 pages, vol. 5, IEEE, retrieved from https://ieeexplore.ieee.org/document/8066287.
Duan, Zhenhai, et al., "Service Overlay Networks: SLAs, QoS, and Bandwidth Provisioning," IEEE/ACM Transactions on Networking, Dec. 2003, 14 pages, vol. 11, IEEE, New York, NY, USA.
Li, Shengru, et al., "Source Routing with Protocol-oblivious Forwarding (POF) to Enable Efficient e-Health Data Transfers," 2016 IEEE International Conference on Communications (ICC), May 22-27, 2016, 6 pages, IEEE, Kuala Lumpur, Malaysia.
Ming, Gao, et al., "A Design of SD-WAN-Oriented Wide Area Network Access," 2020 International Conference on Computer Communication and Network Security (CCNS), Aug. 21-23, 2020, 4 pages, IEEE, Xi'an, China.
Tootaghaj, Diman Zad, et al., "Homa: An Efficient Topology and Route Management Approach in SD-WAN Overlays," IEEE INFOCOM 2020—IEEE Conference on Computer Communications, Jul. 6-9, 2020, 10 pages, IEEE, Toronto, ON, Canada.

\* cited by examiner

TUNNEL-LESS SD-WAN

BACKGROUND

In the field of network computing, a wide area network (WAN) system allows companies to incorporate separate local area networks (LANs) as a single effective network. Software-defined wide area networking (SD-WAN) systems are a way of operating such WANs that reduces various network problems such as variations in packet delay, network congestion, and packet loss. SD-WAN systems send data packets (e.g., TCP packets) through managed forwarding nodes (sometimes referred to herein as "nodes" or "MFNs") of an SD-WAN. The packets are sent from the original source address of the packet to the final destination address through a series of nodes of the SD-WAN.

Some existing SD-WAN systems use IP tunnels. Each network site is provided with an SD-WAN device connected to the LAN. Data packets from one network site to another are sent to the SD-WAN device and encapsulated before being sent to an SD-WAN device of another network site through the nodes. In some existing systems, the encapsulation includes adding additional header to each packet of a packet flow at each node. The headers successively direct the packets to the next node in a path from the original source of the packet to a final destination of the packet. The headers include an inner header with an original source and final destination of the data packet that is prepended when the packet is initially sent and an outer header that includes an address for the next hop of the packet. In such systems, the outer packet is replaced at each hop with a packet identifying a subsequent hop for the packet. Other systems may group packets together and encrypt them. However, such systems may be inefficient as they require every packet to have an outer header removed, analyzed, and replaced with a new header at each successive node. Accordingly, there is a need for more efficient tunnel-less SD-WAN system.

BRIEF SUMMARY

In a novel tunnel-less SD-WAN, when an ingress node of the SD-WAN receives a new packet flow, it identifies the path of the flow through the SD-WAN, and sends an initial prepended set of SD-WAN header values before the first packet for the flow to the next hop (e.g., another node, or a destination outside the SD-WAN) along this identified path, rather than encapsulating each packet of the flow with encapsulating tunnel headers that store SD-WAN next hop data for the flow. The prepended set of SD-WAN header values is then used to not only forward the first packet through the SD-WAN, but also to create records at each subsequent hop, which are then used to forward subsequent packets of the flow through the SD-WAN. Instead of identifying the entire packet flow, the first hop in the SD-WAN does not identify the entire path for the packet flow in some embodiments, but just identifies the next hop, as each subsequent hop in the SD-WAN has the task of identifying the next hop through the SD-WAN for the packet flow. Also, in some embodiments, each hop also creates records for the reverse flow in order to automatically forward reply packets along a reverse route. In some embodiments, the records comprise a TCP splicing record between two TCP connections of the node.

In some embodiments, the SD-WAN ingress node (referred to below as the "first hop") generates the initial prepended set of one or more header values as part of a TCP split optimization operation that its TCP splitter (e.g., a TCP splitting machine, module, or server) performs. Under this approach, the packet flow is a TCP flow sent from a source machine outside of the SD-WAN (e.g., from a source computing device, or a source gateway, outside of the SD-WAN). The TCP splitter in some embodiments terminates the TCP connection and starts a new TCP connection to the next hop. That is, as the TCP splitter at each hop has a TCP connection to a previous hop and sets up a new TCP connection to the next hop, a TCP splitter at each hop can also be thought of as a TCP connector.

From the header of the received flow, the TCP splitter identifies (i.e., reads) the destination address of the first TCP packet. In some embodiments, the TCP splitter then identifies the path for the flow through the SD-WAN to a destination machine outside of the SD-WAN (e.g., to a destination computing device, or a destination gateway, outside of the SD-WAN). The TCP splitter then generates a set of SD-WAN header (SDH) values for the flow, each SDH value specifying the network address for a next hop address along the path. In some embodiments, the SDH values are part of a single SDH header, in other embodiments, the SDH values are in multiple headers (e.g., one header per SDH value, etc.). The TCP splitter then sends the generated set of SDH values to the next hop and then sends the first packet and subsequent packets of the TCP flow to the next hop. The set of SDH values are sent ahead of the first TCP packet in some embodiments, while in other embodiments they are prepended to the first packet but not the other packets of the flow. In either case, the tunnel-less SD-WAN system is referred to as a "prepended TCP" system or a "prepended TCP flow" system.

In some embodiments, the TCP splitter of the first hop identifies the path through the SD-WAN by using the header values of the first packet (e.g., its destination network addresses (such as layers 2-4 addresses) and in some cases the source network addresses (such as the layers 2-4 addresses)) to identify a path-traversal rule that specifies one or more possible paths for the TCP splitter to select for the flow through the SD-WAN. As mentioned above, the set of SDH values in some embodiments includes the network address for each subsequent hop along the SD-WAN to reach the flow's destination outside of the SD-WAN. In other embodiments, the first hop TCP splitter only includes in its generated set of SDH values the network address for the next hop, as each subsequent SD-WAN hop in these embodiments identifies the next hop after receiving the prepended packet from a previous hop.

In some of the embodiments where the first hop's prepended header includes the network addresses for each hop along the SD-WAN, each subsequent hop removes its network address from the prepended header, identifies the network address for the next hop along the SD-WAN, creates a record that stores the next-hop's network address for this flow, and forwards the prepended header (e.g., the first packet with the prepended header or the prepended packet flow) along to the next hop when the next hop is another hop along the SD-WAN.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
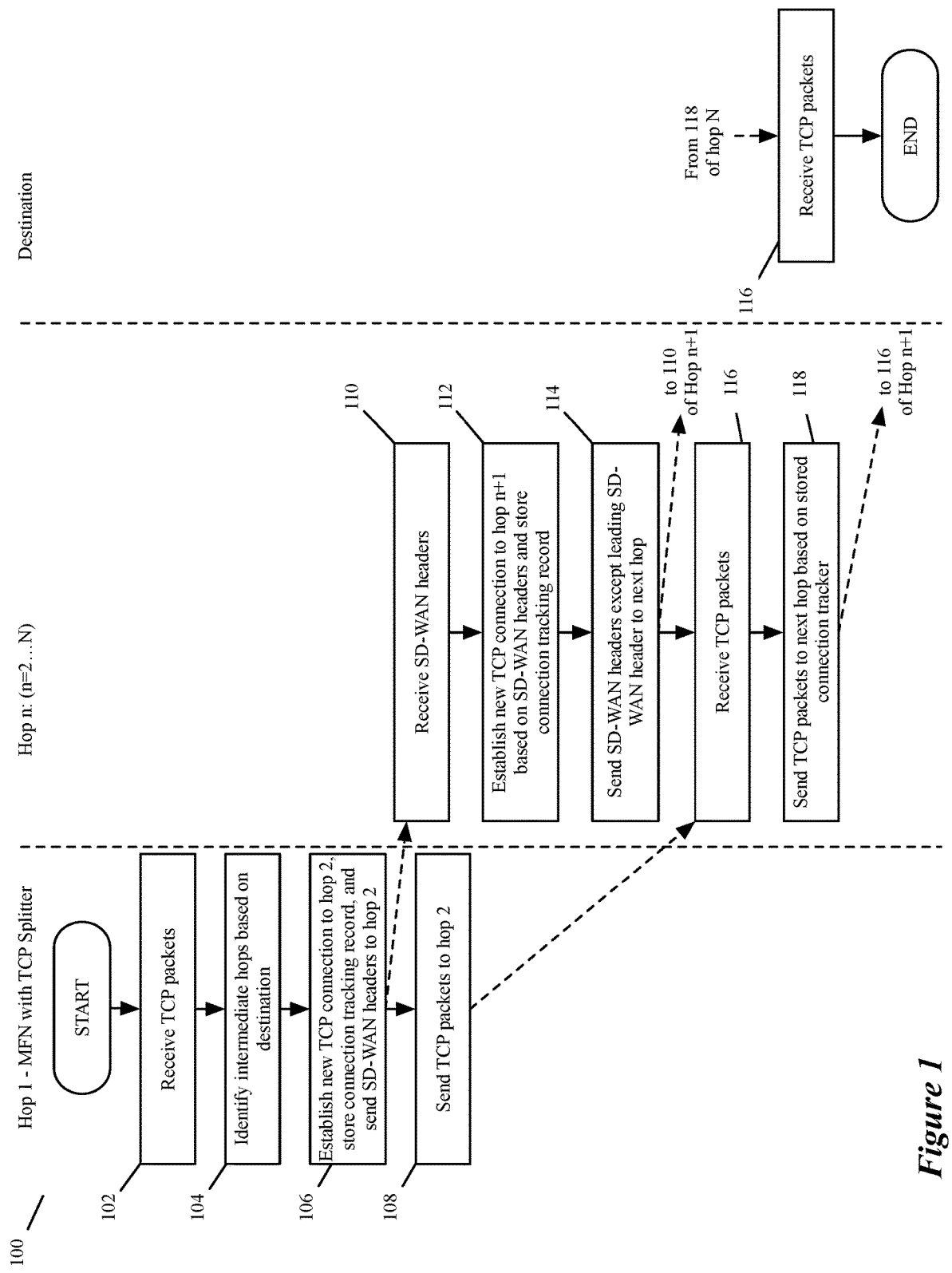
FIG. 1 conceptually illustrates a process of some embodiments for sending a flow of TCP packets through a tunnel-less SD-WAN.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

In a novel tunnel-less SD-WAN, when an ingress node of the SD-WAN (also referred to below as the "first hop") receives a new packet flow, it identifies the path of the flow through the SD-WAN, and sends an initial prepended set of SD-WAN header values before the first packet for the flow to the next hop along this identified path, rather than encapsulating each packet of the flow with encapsulating tunnel headers that store SD-WAN next hop data for the flow. The prepended set of SD-WAN header values is then used to not only forward the first packet through the SD-WAN, but also to create records at each subsequent hop, which are then used to forward subsequent packets of the flow through the SD-WAN.

Instead of identifying the entire packet flow, the MFN of the first hop in the SD-WAN does not identify the entire path for the packet flow in some embodiments, but just identifies the next hop, as each subsequent hop in the SD-WAN has the task of identifying the next hop through the SD-WAN for the packet flow. Also, in some embodiments, each hop also creates records for the reverse flow in order to automatically forward reply packets along a reverse route. In some embodiments, the records comprise a TCP splicing record between two TCP connections of the node. In such embodiments, one set of TCP splicing records (per node) may allow both forward and reverse routing. SD-WANs are sometimes referred to herein as "virtual networks."

Several embodiments will now be described by reference to FIGS. 1-5. In these embodiments, the first hop in the SD-WAN generates the initial prepended set of one or more header values as part of a TCP split optimization operation that its TCP splitter performs. Under this approach, the packet flow is a TCP flow sent from a source machine outside of the SD-WAN (e.g., from a source computing device, or a source gateway, outside of the SD-WAN). The TCP splitter in some embodiments terminates the TCP connection and starts a new TCP connection to the next hop.

From the header of the received flow, the TCP splitter identifies (i.e., reads) the destination address of the first TCP packet. In some embodiments, the TCP splitter then identifies the path for the flow through the SD-WAN to a destination machine outside of the SD-WAN (e.g., to a destination computing device, or a destination gateway, outside of the SD-WAN). The TCP splitter then generates a set of SD-WAN header (SDH) values for the flow, each SDH value specifying the network address for a next hop address along the path. In some embodiments, the SDH values are part of a single SDH header, in other embodiments, the SDH values are in multiple headers (e.g., one header per SDH value, etc.). The TCP splitter then sends the generated set of SDH values to the next hop and then sends the first packet and subsequent packets of the TCP flow to the next hop. The set of SDH values are sent ahead of the first TCP packet in some embodiments, while in other embodiments they are prepended to the first packet but not the other packets of the flow. In either case, the tunnel-less SD-WAN system is referred to as a "prepended TCP" system or a "prepended TCP flow" system.

In some embodiments, the TCP splitter of the first hop identifies the path through the SD-WAN by using the header values of the first packet (e.g., its destination network addresses (such as layers 2-4 addresses) and in some cases the source network addresses (such as the layers 2-4 addresses)) to identify a path-traversal rule that specifies one or more possible paths for the TCP splitter to select for the flow through the SD-WAN. As mentioned above, the set of SDH values in some embodiments includes the network address for each subsequent hop along the SD-WAN to reach the flow's destination outside of the SD-WAN. In other embodiments, the first hop TCP splitter only includes, in its generated set of SDH values, the network address for the next hop, as each subsequent SD-WAN hop in these embodiments identifies the next hop after receiving the prepended packet from a previous hop.

In some of the embodiments where the first hop's prepended header includes the network addresses for each hop along the SD-WAN, each subsequent hop removes its network address from the prepended header, identifies the network address for the next hop along the SD-WAN, creates a record that stores the next-hop's network address for this flow, and forwards the prepended header (e.g., the first packet with the prepended header or the prepended packet flow) along to the next hop when the next hop is another hop along the SD-WAN.

Figure 2:
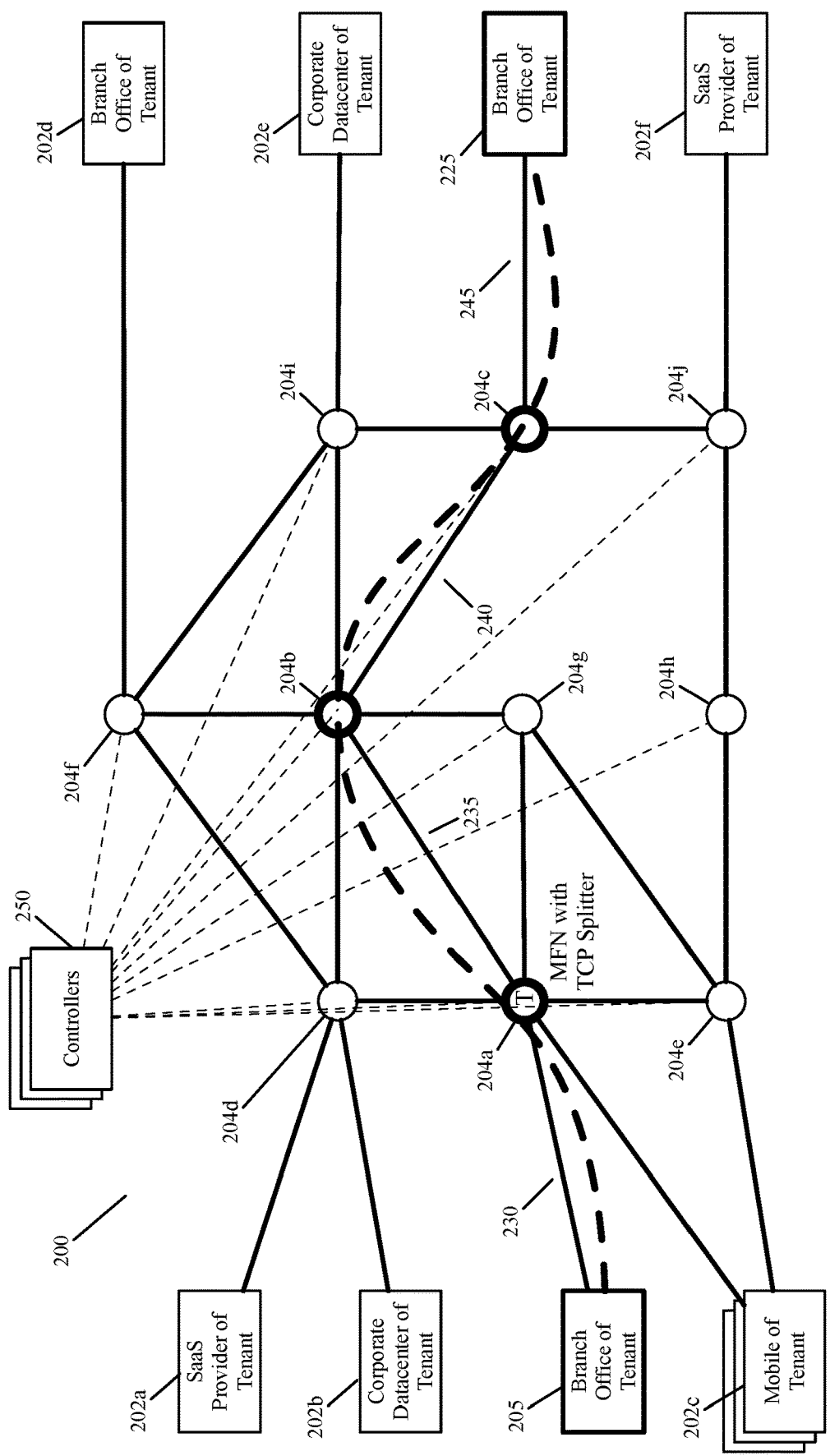
FIG. 2 illustrates a tunnel-less SD-WAN system.

FIG. 1 conceptually illustrates a process 100 of some embodiments for sending a flow of TCP packets through a tunnel-less SD-WAN. FIG. 1 will be described with references to FIGS. 2 and 3B. FIG. 2 illustrates a virtual network 200. FIG. 2 includes multiple tenant locations at different locations 202a-202f, a tenant location 205 that is a source of a TCP packet flow, a tenant location 225 that is a destination of the TCP packet flow, managed forwarding nodes 204a-204j, network connections 230, 235, 240, and 245, and controllers 250.

Node 204a is a first hop in a tunnel-less SD-WAN route, from tenant location 205 to tenant location 225, through the network 200. Nodes 204b and 204c are subsequent hops in the route. Tenant locations 202a-202f and SD-WAN nodes 204d-204j are included to illustrate that an SD-WAN system generally has multiple network locations and multiple nodes that are not involved in any given TCP flow. The connections within network 200 (e.g., connections 235, 240) represent communicative connections between the nodes that may be selected by the next-hop forwarding rules to define paths through the SD-WAN network. These connections may include their own security protocols, such as IPsec or other such protocols or may use some other data security measure.

The controllers 250 provide forwarding rules and path-selection rules (e.g., next-hop forwarding rules, and in some embodiments other forwarding rules used to determine routes through the network 200) to the managed forwarding nodes 204a-204j. A path selection rule, in some embodiments, has (1) match criteria defined in terms of header values, and (2) one or more paths to destination. In some embodiments, each path has a path identifier, which is looked up in a table to identify all hops along path. Alternatively, a path can be defined directly in the path selection rule. The same node may assign more than one path when it is distributing loads for different flows (e.g., multiple flows with different source addresses and/or different destination addresses).

The active elements of FIG. 2, tenant locations 205 and 225, managed forwarding nodes 204a-204c, and network connections 230, 235, 240, and 245 are further described with respect to the operations of FIG. 1.

Figure 3A:
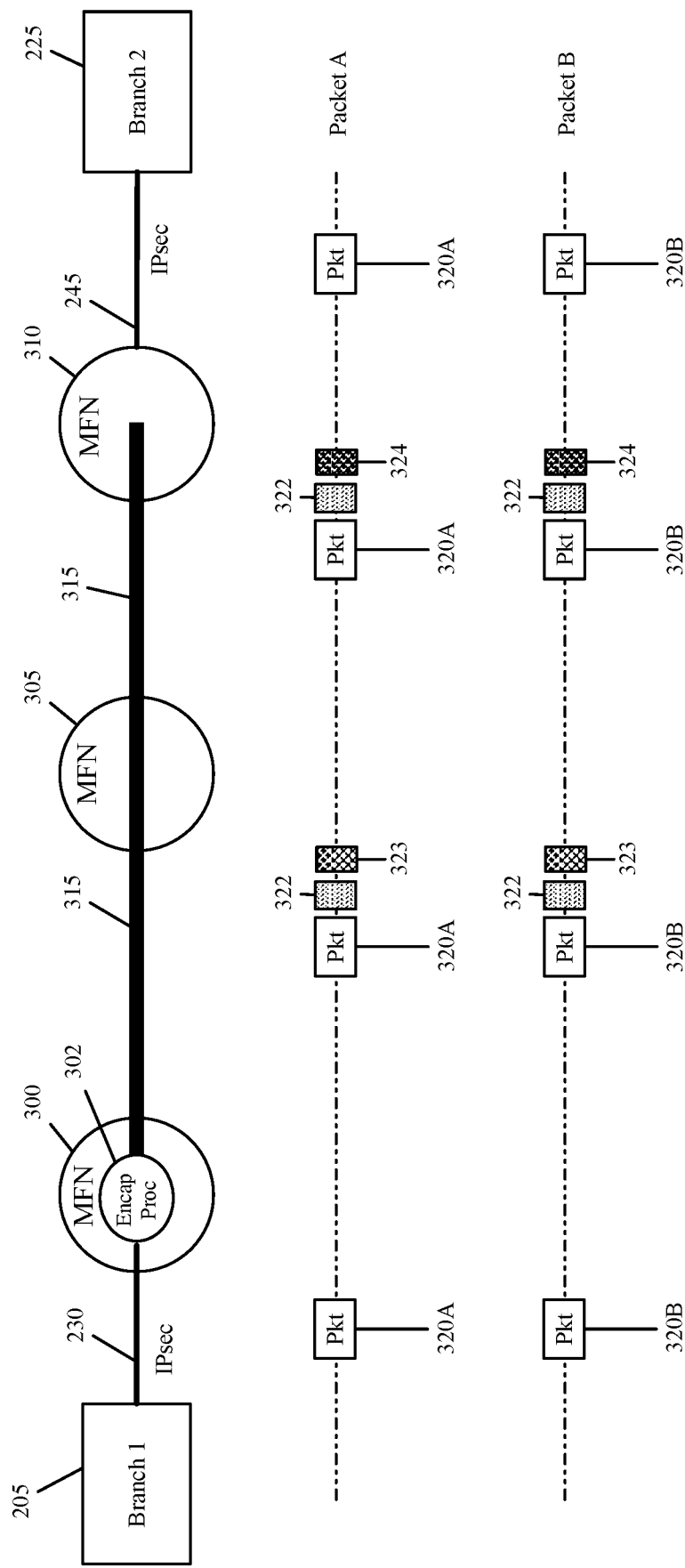
FIG. 3A illustrates a prior art system for sending packets in tunnels.

FIG. 3A illustrates a prior art system for sending packets in tunnels, which will be described briefly to contrast such a system with the present invention. FIG. 3A includes tenant location 205, connections 230, and 245, managed forwarding node 300 with encapsulation processor 302, managed forwarding nodes 305 and 310, tunnel 315, packets 320A and 320B, inner encapsulation header 322, and outer encapsulation headers 323 and 324. In the prior art shown, the tenant location 205 sends a data flow comprising multiple packets (here, packets 320A and 320B) through a network of managed forwarding nodes 300, 305, and 310 to tenant location 225.

The packets 320A and 320B are initially sent through connection 230 using IPsec for security. The encapsulation processor 302 of managed forwarding node applies an overlay tunnel (represented by tunnel 315) to the packets 320A and 320B. The overlay tunnels in some prior art systems include encryption of the packets being sent. The encapsulation processor 302 also prepends a pair of headers to every packet of the data flow. These two tunnel headers are (1) an inner header 322 that identifies (e.g., by IP address) the ingress MFN 300 and egress MFN 310 for entering and exiting the virtual network, and (2) an outer header 323 that identifies the next hop MFN 305. The outer header 323 includes a source IP address corresponding to MFN 300 and a destination IP address corresponding to the next hop, MFN 305. The inner tunnel header 322, in some embodiments, also includes a tenant identifier (TID) in order to allow multiple different tenants of the virtual network provider to use a common set of MFNs of the virtual network provider.

When, as in FIG. 3A, the path to the egress MFN 310 includes one or more intermediate MFNs (here, MFN 305), the intermediate MFN(s) replace the outer header with an outer header addressed to the next hop. Here, outer header 323 is replaced with outer header 324. The source IP address in the new outer header 324 is the IP address of MFN 305. The intermediate MFN 305 uses the destination IP address in the inner header 322 to perform a route lookup in its routing table to identify the destination IP address of the next hop MFN (here MFN 310) that is on the path to the destination IP address of the inner header. The replacement outer header 324 includes a destination IP address of next hop MFN 310 (as identified through the route table lookup). The managed forwarding node 310 then terminates the tunnel by removing the inner header 322 and outer header 324 from each packet and decrypting the packets before sending them through the connection 245 using IPsec for security.

Figure 3B:
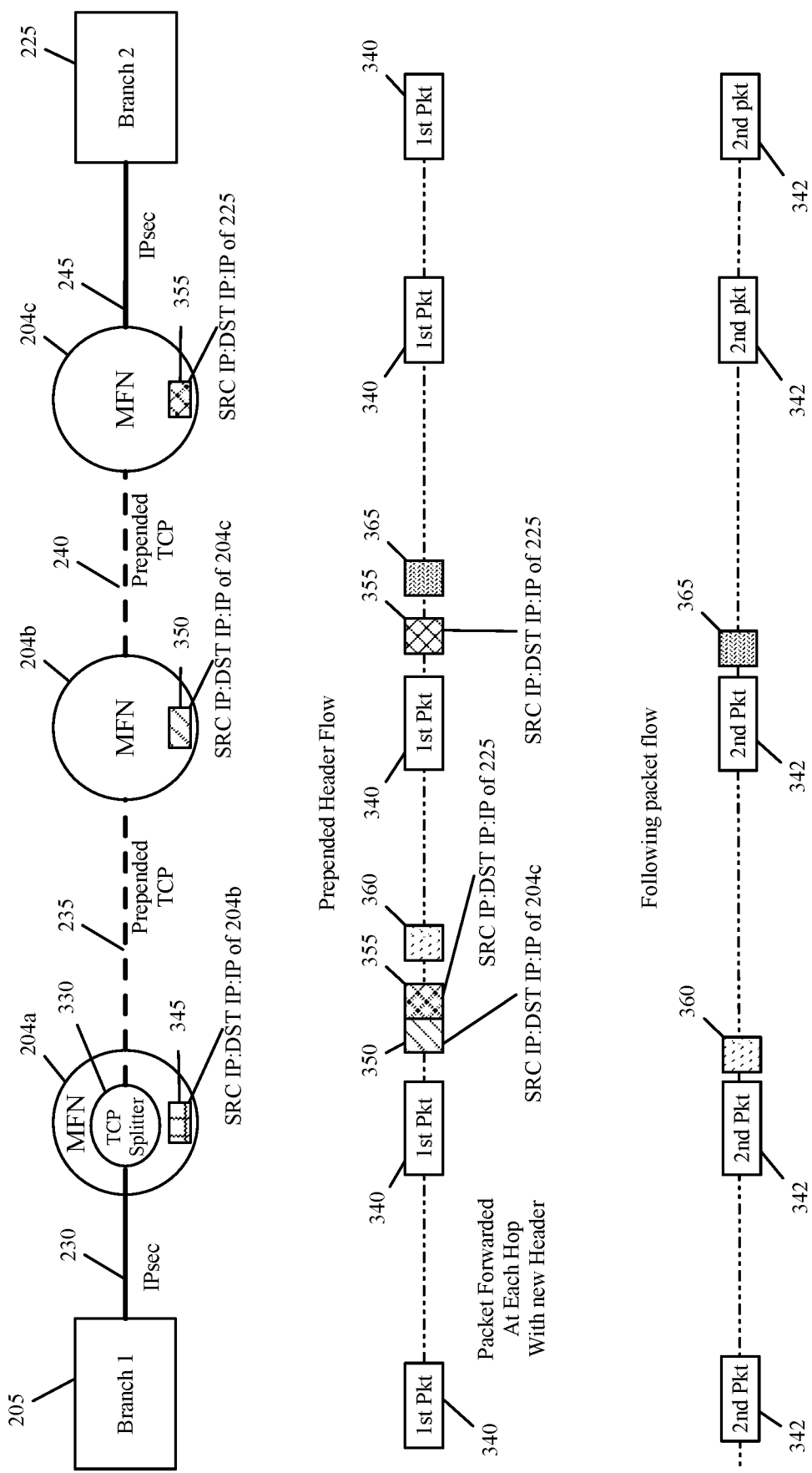
FIG. 3B illustrates a path of nodes through a network using a tunnel-less SD-WAN system and data sent through the nodes.

Some advantages of the present tunnel-less SD-WAN invention include that the present invention does not require replacing an outer encapsulation header in every single packet of a data flow (which could be millions of packets) at every intermediate node, nor does the present invention require a route lookup from a routing table at each intermediate node for every packet of every flow. FIG. 3B illustrates a path of nodes through a virtual network using a tunnel-less SD-WAN system and data sent through the nodes. In addition to the active elements of FIG. 2, FIG. 3B also includes TCP splitter 330, a first packet 340 of a TCP flow, a second packet 342 of the TCP flow routing data 345, SDH headers/routing data 350 and 355, and new headers 360 and 365.

In FIG. 1, the process 100 transmits data through a managed forwarding node with a TCP splitter. The process 100 receives (at 102) a TCP packet flow at the MFN 204a of FIG. 2. The MFN 204a is one of several in the virtual network 200. Each MFN 204a-204c in the virtual network 200 has a cloud forwarding element. In some embodiments, multiple or all of the nodes of the virtual network have TCP splitters. Further description of the managed forwarding nodes of some embodiments is provided with respect to FIG. 5, below. Still further description of virtual networks and managed forwarding nodes can be found in U.S. patent application Ser. No. 15/972,083, filed May 4, 2018, now published as U.S. Patent Publication 2019/0103990, which is incorporated herein by reference. In FIG. 3B, first TCP packet 340 goes from tenant location 205 to node 204a, which is an MFN with a TCP splitter 330. In some embodiments, the TCP splitter is implemented as an operation of an optimization engine of the MFN 204a as described with respect to FIG. 5, below. In FIG. 3B, the final destination address of the TCP flow is a machine or device at the tenant location 225.

After receiving at least the first packet 340, the process 100 of FIG. 1 then identifies (at 104) a route comprising a series of hops through intermediate MFNs to send the TCP flow to the destination address. The process 100 identifies the route through the MFNs based on the initial MFN and the destination of the TCP flow, in some embodiments.

The process 100 of FIG. 1 then establishes (at 106) a new TCP connection to the MFN of the second hop, stores a connection tracking record associating the TCP connection on which the first packet was received with the new TCP connection, and sends the SDH values from the first hop (i.e., the MFN with the TCP splitter) to the MFN identified as the second hop. A TCP connection between two machines or devices includes an IP address and port address for each machine/device. The combination of an IP address and port address is sometimes called a "socket", so a TCP connection has a socket at the source machine and another socket at the destination machine. TCP connection data for each TCP packet is stored in the header of the TCP packet. The set of data identifying the connection used by the packet is referred to as a tuple. Some embodiments identify connections using a 4-tuple (source IP address, source port, destination IP address, and destination port), other embodiments identify connections using a 5-tuple (the same values as the 4-tuple plus a value identifying a protocol of the packet). Storing the connection tracking record (of operation 106 of FIG. 1) associates the TCP connection from the branch 205 (of Figure #3b) to MFN 204a with the new connection from MFN 204a to MFN 204b by storing (e.g., in a connection tracking record storage of the MFN 204a) a 5-tuple or in some embodiments a 4-tuple, identifying the incoming connection and a 5-tuple (or 4-tuple) identifying the new connection in a single connection tracking record. One of ordinary skill in the art will understand that in some embodiments, some information of the tracking record may be stored implicitly. For example, some embodiments omit the protocol value from the connection tracking record and/or omit the IP address of the MFN itself (e.g., in cases where the MFN has only one IP address, every incoming packet will have that IP address as its destination and every outgoing packet will have that IP address as its source, though different connections could use different ports of the MFN).

After (or in some embodiments, before) storing the connection tracking record, the MFN 204a sends SD-WAN headers to MFN 204b. Unlike the encapsulation headers of the prior art overlay tunnel, the SDH values are not added to every packet in the TCP flow, instead the SDH values are sent only once for the TCP flow. In some embodiments, the SDH values are sent ahead of the first packet of the TCP flow. In other embodiments, the SDH values are sent prepended to only the first packet of the TCP flow (e.g., prepended to the payload of the first packet or prepended as additional headers of the first packet 340 of FIG. 3). In either case, the tunnel-less SD-WAN system may be referred to as a "prepended TCP" system or "prepended TCP flow" system because the SDH values are prepended to the flow rather than to the individual packets. As the SDH values are only sent once, the second packet 342 and any subsequent packets of the same flow (not shown) are sent without prepending headers to those packets.

In FIG. 3B, new header 360 and SDH headers 350 and 355 are shown preceding (e.g., prepended to, or sent ahead of, the first packet) the packet 340 out of node 204a. The new header 360 identifies the TCP connection between MFNs 204a and 204b. Specifically, it is a header with a 5-tuple that includes (as the source address) an IP address and port address of MFN 204a and (as the destination address) an IP and port address of MFN 204b and a protocol of the packet. SDH 350 identifies node 204c as the next hop after node 204b, SDH 355 identifies the original destination IP address in tenant location 225 as the next destination after node 204c. In the illustrated embodiment, the SDH values are sent out in the same order as the nodes they identify. However, they may be sent in other orders in other embodiments.

The routing data 345, stored in the node 204a, identifies node 204b as the next hop after node 204a. In some embodiments, the routing data 345 for the TCP connection to the next hop is stored as part of the connection tracking record pairing (e.g., splicing) (a) the incoming TCP connection (of the node 204a) through which the packet 340 was received from a machine or device at tenant location 205 with (b) the TCP connection (of node 204a) to node 204b. In some embodiments, each flow uses a separate TCP connection between each pair of selected MFNs in the planned route. In some embodiments, there is also a separate TCP connection between the branch office 205 and the first hop MFN 204a and/or another separate TCP connection between the final hop MFN 204c and the branch office 225.

Each flow in some embodiments (i.e., each set of packets with the same original source and destination addresses) receives its own set of TCP connections between MFNs. A second flow (either from the same source address to a different destination address, from a different source address to the same destination address, or from a different source and different destination addresses as the first flow) in some embodiments can pass through one, some, or all of the same MFNs as the first flow, but every TCP connection that the second flow uses will be different from any connection that the first flow uses. One of ordinary skill in the art will understand that in some embodiments, different connections may have some values in common, for example, two connections between the same pair of MFNs could use the same IP and port address at the first MFN and still be separate connections so long as each connection's IP and/or port address at the second MFN are different. However, in some embodiments, the SD-WAN may reserve a particular IP address and port address for a particular flow rather than allowing multiple connections of multiple flows to use that particular IP address and port address.

More specifically, splicing two TCP connections of a node together configures the node so that, for any packet coming in with a header identifying a 5-tuple of one TCP connection (which will be called "the first connection" here, while the other TCP connection of the splice will be called "the second connection" for clarity) the header specifying the first connection will be replaced with a header specifying the second connection. Such a replacement may be performed using a match-action rule in some embodiments. In such embodiments, incoming packets whose headers include 5-tuples that match the stored 5-tuple of a connection tracking record trigger an action to replace the header with a header that includes the 5-tuple of the other connection stored in the connection tracking record.

After the old header is replaced with a new header (e.g., header 360 being replaced with header 365 at MFN 204b), the packet is sent on toward the subsequent MFN (e.g., MFN 204c). In some embodiments, TCP splicing also configures the node to receive and then forward reply packets. The reply packets will be received at the second connection and forwarded through the first connection to the "next hop" of the reply packets, which is the same MFN as the "prior hop" for packets in the original direction. In some embodiments that use a match-action rule, the match-action rules apply in both directions, but with match and action reversed for reply packets. That is, for packets of the original packet flow, the match attribute corresponds to the first connection and the action attribute corresponds to the second connection, while for packets of the reply packet flow, the match attribute corresponds to the second connection (with source and destination reversed from the action attribute of the original packet flow) and the action attribute corresponds to the first connection (with the source and destination reversed from the match attribute of the original packet flow).

Although the embodiments of the above description implement forwarding using connection tracking records and TCP socket splicing, in other embodiments, the routing data 345 is stored in some other format that identifies node 204b as the next hop for the TCP flow. Details about how the nodes splice the TCP connections and the contents of the SDH headers 350 and 355 and the first packet 340 for some embodiments are described with respect to FIG. 4, below.

The process 100, of FIG. 1, then sends (at 108) the 2nd and subsequent packets of the TCP flow from the MFN of the first hop to the MFN identified as the second hop. The 2nd and subsequent packets also have their headers replaced at the MFN of each hop. An example of this is shown in FIG. 3B, in which second packet 342 receives the same new header 360 at MFN 204*a* as the first packet 340, although not the SMH headers 350 and 355.

Before receiving the second packet 342, the MFN of the second hop 204*b* receives and processes the first packet 340 and its SDH headers 350 and 355 previously sent from the MFN 204*a* of the first hop. As shown in FIG. 1, the process 100 receives (at 110) the SDH values at the MFN of the next hop. The process 100 then establishes (at 112) a new TCP connection to the MFN identified as the MFN of the next hop by the SDH values and stores a connection tracking record that associates the connection of the incoming packets with the new connection. In some embodiments, the SDH values identify an IP address of the MFN of the next hop. In other embodiments, the SDH values provide a node identifier value that the MFN (e.g., the TCP connector of the MFN) uses to determine an IP address of the next hop MFN. In FIG. 3B, node 204*b* stores routing data (e.g., a 4-tuple or 5-tuple for the connection to the MFN of the next hop) corresponding to SDH 350, which identifies node 204*c* as the next hop for the TCP flow. In some embodiments, this routing data is stored as part of the connection tracking record in a connection tracking record storage of the MFN. In some embodiments, the connection tracking record also includes data identifying the incoming connection from which the packet 340 and its SDH headers 350 and 355 were received. To clarify that the routing data 350 stored at node 204*b* includes the connection identified in the SDH 350, they are both labeled with the same item number. However, one of ordinary skill in the art will understand that the format in which the routing data 350 is stored may be different in some embodiments than the format of the SDH 350. In some embodiments, as mentioned, the routing data 350 for the next hop is stored in a connection tracking record. In other embodiments, the routing data 350 is stored in some other format (e.g., a set of rules in some format) that identifies node 204*b* as the next hop for the TCP flow.

In the illustrated embodiment of FIG. 1, the MFN of the first hop identifies the specific MFNs of the route, but does not specify what port addresses each MFN should use to connect to the subsequent MFNs. Furthermore, in some embodiments, where an MFN may have more than one IP address, the MFN of the first hop may specify the MFNs of the route without determining what IP address each MFN should use to connect to the MFN of the next hop. In other such embodiments, the first hop MFN may specify IP addresses for each subsequent hop, but still leave the port address determination to the subsequent MFNs. However, in other embodiments, rather than the initial MFN planning the entire route and sending out headers for each MFN along with a flow identifier (e.g., the original source and destination addresses of the packet flow), the MFN of the initial hop sends out just the flow identifier and each MFN identifies the next MFN on the route (or, for the last MFN of the route, determines that the MFN should connect to the final destination).

The process 100 of FIG. 1 then sends (at 114) the SDH values from the present MFN to the MFN at the next hop of the SD-WAN path, after removing the SDH values that identify the present node. In FIG. 3B, node 204*b* sends the packet 340 and SDH 355 to node 204*c* after removing SDH 350 and replacing header 360 with new header 365. In some embodiments, rather than reading and removing a leading SDH and sending the remaining SDHs on, each MFN sends all the SDHs and the SDHs include a pointer value that identifies the SDH values for the MFN receiving the SDHs to use. The receiving SDH then uses the SDH values identified by the pointer and updates the pointer value to point at the SDH values for the subsequent MFN before sending the entire set of SDHs on.

The process 100 of FIG. 1 then receives (at 116) the subsequent packets of the TCP flow and sends (at 118) the TCP flow to the next hop. In FIG. 3, MFN 204*b* receives second packet 342 and sends it to MFN 204*c* after replacing header 360 with header 365.

The process 100 repeats operations 110-118 at each node of the path until the SDH values and TCP packets reach the last node of the SD-WAN path before the final destination of the TCP flow. In FIG. 3B, the last node of the SD-WAN path is node 204*c*, which stores (at 112) routing data 355 corresponding to SDH 355 in the same manner as node 204*b* stores routing data 350. Since the "next hop" of the last node 204*c* is the destination IP at tenant location 225, there are no more SD-WAN nodes in the path. Therefore, node 204*c* skips operation 114 (of FIG. 1) and does not send out an SDH, but does send TCP packets 340, 342, and others in the flow (not shown) to the destination tenant location 225. The destination IP address receives (at 116) the TCP packets.

In some embodiments, the MFN 204*c* of the last hop restores the original header of the packets so that any firewalls and/or other analysis applications will identify the flow as originating from tenant location 205. In some embodiments, the MFN 204*c* sends the TCP packets of the flow to the edge gateway of the destination tenant location 225 through an IPsec connection. In some embodiments, the edge gateway creates a connection tracking record that maps the 5-tuple (or 4-tuple) of the received flow to the IPsec connection with the MFN 204*c* that forwarded the flow to the edge gateway. The edge gateway then uses the connection tracking record, when sending a reverse flow from the destination machine of the original flow to the source machine of the original flow, in order to forward the reverse flow to the correct MFN 204*c*, now acting as the ingress node, to the virtual network, for the reverse flow. The MFN 204*c* then uses its connection tracking record to select the connection with the MFN 204*b* to forward the reverse flow to the MFN 204*b*, which then uses its connection tracking record to forward the reverse flow to the MFN 204*a*. The MFN 204*a* then replaces the original header of the reverse flow (i.e., a 4-tuple or 5-tuple corresponding to the original header of the original flow, but with the source and destination addresses swapped) and forwards the reverse flow packets to the edge gateway of the tenant location 205 for forwarding to the original source machine. The edge gateway of the tenant location 205, in some embodiments, may also maintain a connection tracking record that associates the IPsec connection initially used to send the original packet flow to MFN 204*a* with the original packet flow header (5-tuple or 4-tuple) in order to consistently send packets of that flow to the same ingress MFN 204*a*, in some embodiments.

The connection tracking record of the last hop 204*c* may be different from the connection tracking records in the MFNs of the intermediate MFNs (e.g., MFN 204*b*) in some embodiments. In such embodiments, the final hop MFN 204*c* replaces the header 365 of each packet with the original header, rather than a header representing a connection between the MFN 204*c* and the edge gateway of tenant location 225. The connection tracking record of the egress MFN 204*c* may also include additional data identifying the IPsec connection to the edge gateway of tenant location 225 in some embodiments. Similarly, in some embodiments, the connection tracking record of the ingress MFN 204a may include additional data identifying the IPsec connection between the edge gateway of tenant location 205 and the ingress MFN 204a in order to send reply packets through the correct IPsec.

As mentioned above, in the embodiment of FIG. 1, the MFN of the first hop identifies the route through the virtual network 200 and sends SDHs that directly identify the subsequent hops to each hop of the identified route with a subsequent hop (and the final destination to the final hop of the route). However, in other embodiments, at each hop, the MFN identifies the subsequent hop, e.g., based on data in the configuration packet that does not directly identify the subsequent hop for each MFN.

Figure 4A:
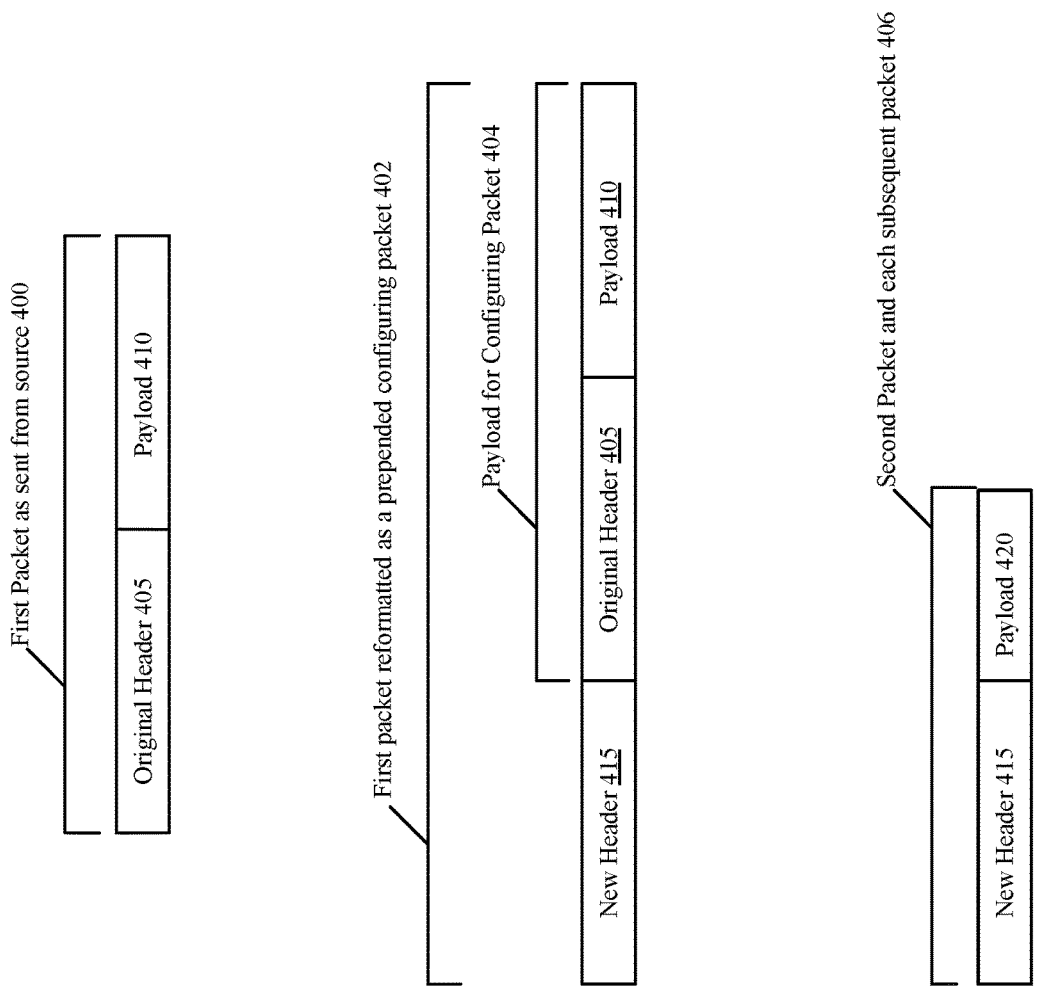
FIG. 4A illustrates data structures for SDH values and TCP packets of some embodiments in which each hop identifies the next hop.

FIG. 4A illustrates data structures for SDH values and TCP packets of some embodiments in which each hop identifies the next hop. FIG. 4A shows a first packet 400 of a TCP flow in the format it is initially sent from a device outside the SD-WAN, a prepended configuring packet 402 with edited payload 404, and a second packet 406 in the format of the second and subsequent packets as they pass through the SD-WAN.

The first packet 400 as sent from the source (e.g., from a device or machine at a tenant location through an edge gateway, sometimes called an "edge node" or "edge forwarding node," of the tenant location) is formatted as an ordinary TCP packet sent from one device/machine to another. It includes an original header 405, with source and destination addresses corresponding to the original source and destination machines/devices. However, one of ordinary skill in the art will understand that when the packet is sent from the tenant location, the source and destination addresses may have been translated from internal addresses of machines/devices at the client network to external addresses by passing through an edge gateway of the tenant locations with a network address translation (NAT) system.

When the packet 400 is received at a first hop, the node at the first hop reformats the first packet 400 as a prepended configuring packet 402. As mentioned above with respect to FIGS. 3A and 3B, the node of the first hop creates a TCP connection to the node of the next hop. The node of the first hop then generates the prepended configuration packet 402 by replacing the original header 405 with a new header 415 identifying the first hop as the source and the next hop as the destination. The new header 415 allows packets to be sent between the first hop and the next hop. The node of the first hop then appends the original header 405 (or in some embodiments a subset of the values of the original header 405 or another flow identifier that identifies the flow) as part of the data payload 404 for the configuring packet. In some embodiments, the header values are not prepended to the payload of the packet, but are prepended elsewhere, for example, as additional headers or metadata of an existing TCP header, etc. In some such embodiments, the original header 405 data comprises a fixed number of byte (e.g., 12, 16, 32, 40, 64, etc.).

In the embodiments illustrated in FIG. 4A, at each subsequent hop, the node of that hop reads the original header 405 from the data payload 404. Based on the original header 405 data, the subsequent hop identifies a next subsequent hop through which to route a TCP flow between the original source and destination. The node at the subsequent hop sets up a TCP connection between that node and the node of the next subsequent hop. The node replaces the new header 415 with another new header 415 with the subsequent hop as the source and the next subsequent hop as the destination. The node then sends the packet 402 to the next subsequent hop. This continues until the packet 402 reaches the last node in its route through the SD-WAN. The last node removes the original header 405 data from the payload 404, recreating the payload 410. In some embodiments, the last node sets the original destination address as the destination address of the packet. In some embodiments, the last node sets the original source address as the source address of the packet, completing the recreation of the first packet 400 as sent from the source (or in some embodiments, as sent from the edge gateway of the original tenant location).

Recreating the original packet 400 entirely has advantages, for example, by using the original source address, firewalls of the destination tenant location can identify the packets as originating from an allowed address, etc. However, in alternate embodiments, there may be some differences between the original packet 400 when it is sent from the first tenant location and when it is sent from the node at the least hop in the SD-WAN path. For example, in some embodiments the node may edit the packet to use the last hop as the source address.

Once the prepended configuring packet is sent, the second packet 406 (and subsequent packets) receive new headers 415 at each hop that are the same as the new headers 415 received by the prepended configuring packet 402. However, as the TCP connections between the nodes at the hops along the route had already been set up in response to the prepended configuring packet 402, the second packet 406 (and subsequent packets) are sent along at each hop with the same payload 420 as they were originally sent with from the original source.

Figure 4B:
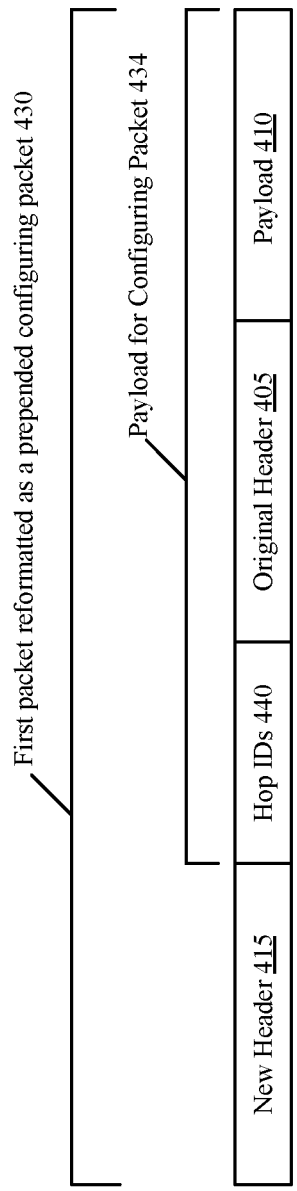
FIG. 4B illustrates a data structure for prepended configuring packets in an alternate embodiment.

FIG. 4B illustrates a data structure for prepended configuring packets in an alternate embodiment in which the entire path through the SD-WAN is determined by the node of the first hop. FIG. 4B shows a prepended configuring packet 430 with an edited payload 434. In this embodiment, in addition to prepending the original header 405 data (or a subset thereof) the first hop prepends a set of one or more hop identifiers (IDs) 440. In this embodiment, the first hop prepends the hop IDs 440 to the payload 410 along with the original header 405 data (or other flow identifier). Then at each subsequent hop, the node of that hop uses the set of hop IDs 440 to generate a TCP connection to the next subsequent hop, before removing the hop ID for itself from the set of hop IDs 440 before sending the packet on to the next subsequent hop. As described with respect to FIG. 4A, each node provides new headers 415 to replace the previous header of the packet 430 with source and destination addresses corresponding to the hop that the packet is being sent on. Similarly, the second packet 406 (and subsequent packets) do not need path configuring data in this embodiment as the nodes have set up the TCP connections based on the prepended configuring packet.

Various embodiments may provide the hop IDs 440 (of FIG. 4B) in various different formats. Some embodiments provide each identifier as an IP address and port address of the next subsequent hop. Other embodiments provide an identifier that specifies the next hop as being a particular node in the network, with the current node determining IP and port addresses based on a lookup table for nodes in the network. As previously mentioned, in some embodiments, rather than reformatting an existing first packet of a TCP flow, the node at the first hop generates a separate configuring packet that identifies the flow and includes identifiers of the subsequent hops. The node then sends this configuring packet out before sending the first packet out without prepending anything to its payload in a similar manner to the second packet 406 of FIG. 4A.

In multi-tenant networks, of some embodiments, routing depends on a tenant ID. In such networks, metadata identifying the tenant (and in some cases additional data) are included in the configuring packet 430, either as metadata of the new header 415, as part of the data prepended in the payload 434 for the configuring packet 430, or elsewhere in the configuring packet 430. For example, in some embodiments, each header has a TLV (type, length, value) structure. This allows adding any number of flexible fields. For example, in some embodiments, the header data includes fields with type "tenant ID" with a specific length and a value that identifies the particular tenant from which the data flow originates, in addition to fields that identify next hop or other values described above. In some embodiments, the TCP connections between each two consecutive hops result in the metadata (identifying a particular tenant) being implicitly part of the TCP stream defined by the packets' source and destination address tuples.

The virtual network 200 described with respect to FIGS. 2 and 3B includes managed forwarding node 204a with a TCP splitter and other managed forwarding nodes. In some embodiments, multiple nodes may implement TCP splitters. In some such embodiments, the nodes include elements such as an optimization engine that performs the TCP splitting. Furthermore, in some embodiments all nodes include an optimization engine or some other element that performs TCP splitting. Additionally, in some embodiments, machines or devices of the tenant locations may include elements that perform TCP splitting.

Figure 5:
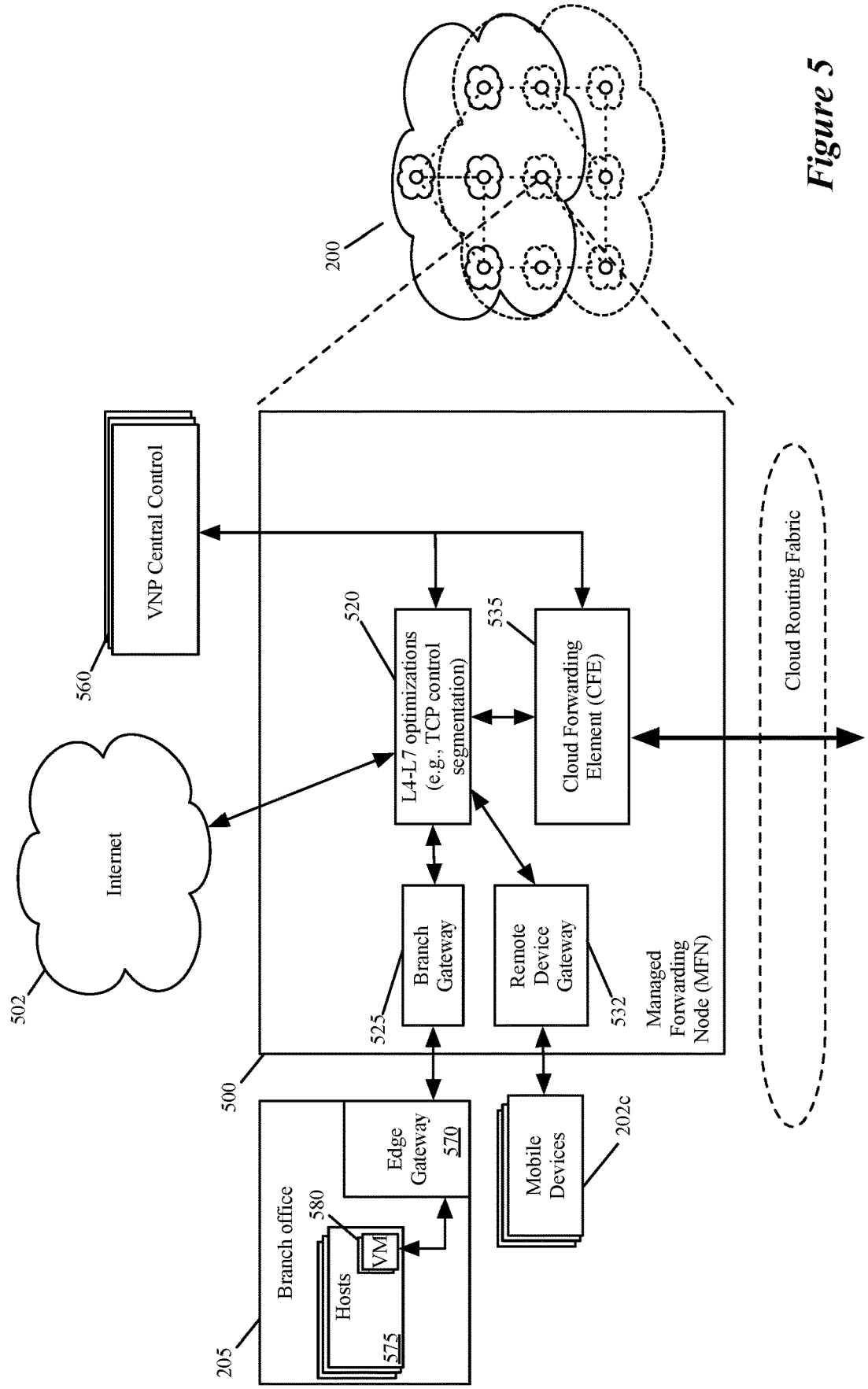
FIG. 5 illustrates an example of a managed forwarding node 500 and a controller cluster 560 of some embodiments.

FIG. 5 illustrates an example of a managed forwarding node 500 and a controller cluster 560 of some embodiments. In some embodiments, each managed forwarding node 500 is a machine (e.g., a VM or container) that executes on a host computer in a public cloud datacenter. In other embodiments, each managed forwarding node 500 is implemented by multiple machines (e.g., multiple VMs or containers) that execute on the same host computer in one public cloud datacenter. In still other embodiments, two or more components of one MFN can be implemented by two or more machines executing on two or more host computers in one or more public cloud datacenters.

In some embodiments, a logically centralized controller cluster 560 (e.g., a set of one or more controller servers) operates inside or outside of one or more public clouds, and configure the public-cloud components of the managed forwarding nodes 500 to implement the virtual network 200 (and in some embodiments, other virtual networks for other tenants) over the public clouds. In some embodiments, the controllers in this cluster are at various different locations (e.g., are in different public cloud datacenters) in order to improve redundancy and high availability. The controller cluster in some embodiments scales up or down the number of public cloud components that are used to establish the virtual network 200, or the compute or network resources allocated to these components.

As shown, the managed forwarding node 500 includes one or more optimization engines 520, edge gateways including branch gateway 525 and remote device gateway 532, and a cloud forwarding element 535 (e.g., a cloud router). In some embodiments, each of these components 520-535 can be implemented as a cluster of two or more components. The optimization engines 520 receive data from and send data to the Internet 502, the cloud forwarding element 535, branch gateway 525 and remote device gateway 532.

The controller cluster 560 in some embodiments can dynamically scale up or down each component cluster (1) to add or remove machines (e.g., VMs or containers) to implement each component's functionality and/or (2) to add or remove compute and/or network resources to the previously deployed machines that implement that cluster's components. As such, each deployed MFN 500 in a public cloud datacenter can be viewed as a cluster of MFNs, or it can be viewed as a node that includes multiple different component clusters that perform different operations of the MFN.

Also, in some embodiments, the controller cluster deploys different sets of MFNs in the public cloud datacenters for different tenants for which the controller cluster defines virtual networks over the public cloud datacenters. In this approach, the virtual networks of any two tenants do not share any MFN. However, in the embodiments described below, each MFN can be used to implement different virtual networks for different tenants. One of ordinary skill will realize that in other embodiments the controller cluster 560 can implement the virtual network of each tenant of a first set of tenants with its own dedicated set of deployed MFNs, while implementing the virtual network of each tenant of a second set of tenants with a shared set of deployed MFNs.

In some embodiments, the branch gateway 525 and remote device gateway 532 establish secure VPN connections respectively with one or more branch offices, such as branch office 205, and remote devices (e.g., mobile devices 202c) that connect to the MFN 500, as shown in FIG. 5. The connection from the branch gateway 525 to the branch office 205, in some embodiments, goes through an edge gateway 570 of the branch office 205. The edge gateway 570 passes the data to and from host machines 575 of the branch office 205 and, through the host machines 575, to virtual machines 580 of the host machines 575.

One example of such VPN connections is IPsec connections as mentioned with respect to FIGS. 3A and 3B. However, one of ordinary skill will realize that in other embodiments, such gateways 525 and/or 532 establish different types of VPN connections.

In the example illustrated in FIG. 5, the MFN 500 is shown to include one or more L4-L7 optimization engines 520. One of ordinary skill will realize that in other embodiments, the MFN 500 includes other middlebox engines for performing other middlebox operations.

The optimization engine 520 executes novel processes that optimize the forwarding of the entity's data messages to their destinations for best end-to-end performance and reliability. Some of these processes implement proprietary high-performance networking protocols, free from the current network protocol ossification. For example, in some embodiments, the optimization engine 520 optimizes end-to-end TCP rates through intermediate TCP splitting and/or termination. In some embodiments, an optimization engine 520, some other component of the node 500, and/or some component of the VNP central control determines an identified routing path for each pair of data message endpoints. This may be a routing path that is deemed optimal based on a set of optimization criteria, e.g., it is the fastest routing path, the shortest routing path, or the path that least uses the Internet.

The cloud forwarding element 535 is the MFN engine that is responsible for forwarding a data message flow to the next hop MFN's cloud forwarding element (CFE) when the data message flow has to traverse to another public cloud to reach its destination, or to an egress router in the same public cloud when the data message flow can reach its destination through the same public cloud. In some embodiments, the CFE 535 of the MFN 500 is a software router.

To forward the data messages, the CFE encapsulates the messages with tunnel headers. Different embodiments use different approaches to encapsulate the data messages with tunnel headers. Some embodiments described below use one tunnel header to identify network ingress/egress addresses for entering and exiting the virtual network, and use another tunnel header to identify next hop MFNs when a data message has to traverse one or more intermediate MFN to reach the egress MFN.

As mentioned with respect to FIG. 3A, in some prior art virtual networks, the managed forwarding nodes send data packets encapsulated with tunnel headers. In some such prior art virtual networks, the CFE sends each packet of the data message with two tunnel headers (1) an inner header that identifies an ingress CFE and egress CFE for entering and exiting the virtual network, and (2) an outer header that identifies the next hop CFE. The inner tunnel header in some prior art systems also includes a tenant identifier (TID) in order to allow multiple different tenants of the virtual network provider to use a common set of MFN CFEs of the virtual network provider. However, in some embodiments of the present invention, rather than sending tunnel headers with each packet of a data message, a TCP splitter of an initial MFN provides a single set of SD-WAN header values for an entire flow, as described with respect to FIGS. 1-4.

Different embodiments define neighboring nodes differently. For a particular MFN in one public cloud datacenter of a particular public cloud provider, a neighboring node in some embodiments includes (1) any other MFN that operates in any public cloud datacenter of the particular public cloud provider, and (2) any other MFN that operates in another public cloud provider's datacenter that is within the same "region" as the particular MFN.

Although the above figures were described with respect to TCP packets, TCP splitters, TCP flows, TCP connections, etc. one of ordinary skill in the art will understand that in other embodiments, other packet protocols (e.g., UDP, ICMP, etc.) may be used. In such embodiments, machines or devices that provide the equivalent operations as a TCP splitter for the respective protocols would be used in place of a TCP splitter and any processes and devices would be adapted to the appropriate protocol.

In the above described embodiments, the ingress MFN replaced the original header of each packet with a header for a TCP connection to the next hop, each intermediate MFN replaced the header of each packet with a header for a TCP connection to the next hop and the egress MFN replaced the header of each packet with the original header of the packet flow. However, in other embodiments, the original header of each packet is left intact at the ingress MFN, with headers representing the TCP connection to the next hop being prepended to each packet and the original header becoming part of the payload of the packet as it is sent through the SD-WAN. The prepended header is then replaced at each intermediate MFN and removed at the egress MFN, leaving the original header as the header of the packet, before the packet is sent to the edge gateway of the destination location.

Figure 6:
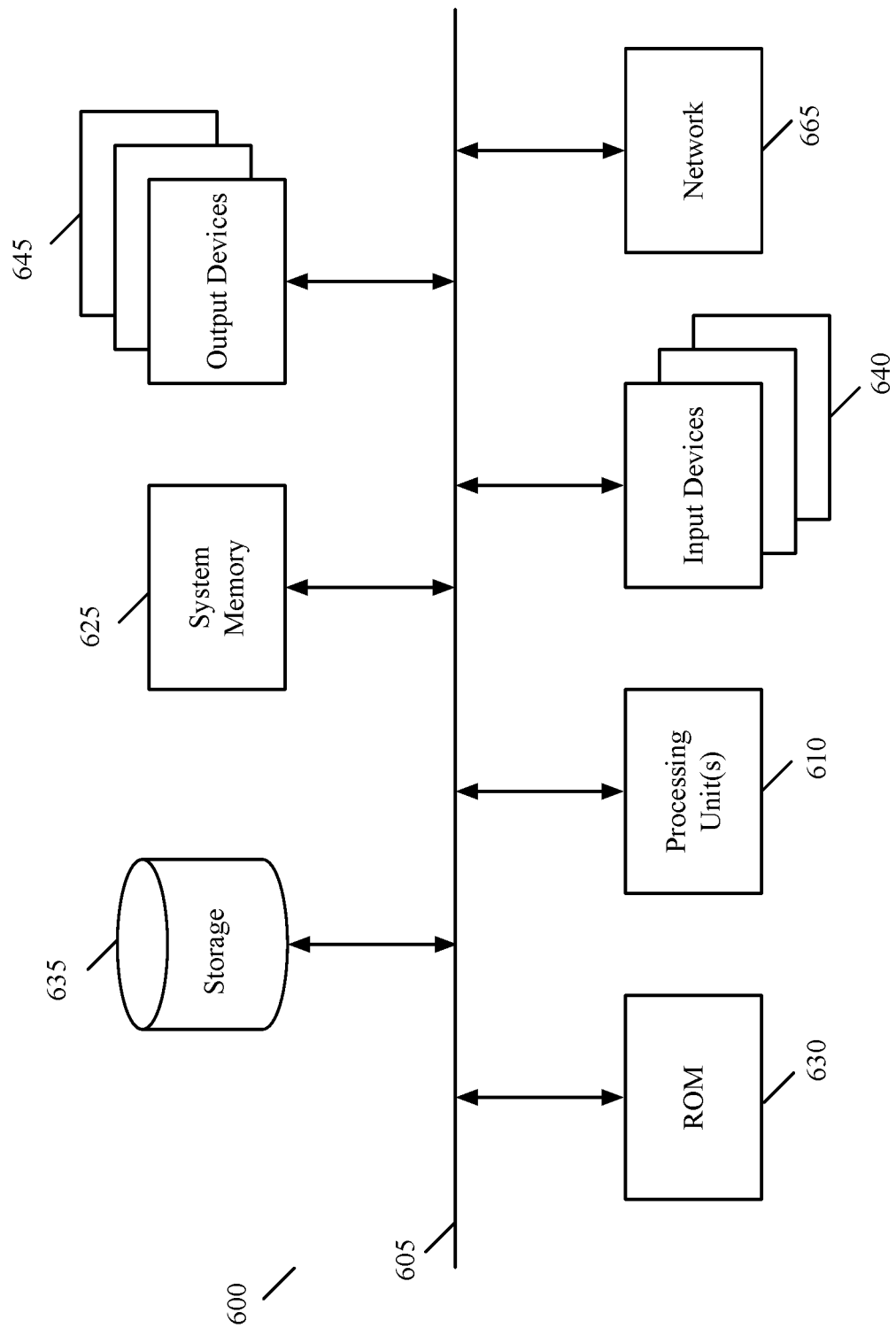
FIG. 6 conceptually illustrates an electronic system with which some embodiments of the invention are implemented.

FIG. 6 conceptually illustrates an electronic system 600 with which some embodiments of the invention are implemented. The electronic system 600 can be used to execute any of the control, virtualization, or operating system applications described above. The electronic system 600 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 600 includes a bus 605, processing unit(s) 610, a system memory 625, a read-only memory 630, a permanent storage device 635, input devices 640, and output devices 645.

The bus 605 collectively represents all system, peripheral, and chipset buses that communicatively connect the numerous internal devices of the electronic system 600. For instance, the bus 605 communicatively connects the processing unit(s) 610 with the read-only memory 630, the system memory 625, and the permanent storage device 635.

From these various memory units, the processing unit(s) 610 retrieve instructions to execute and data to process in order to execute the processes of the invention. The processing unit(s) may be a single processor or a multi-core processor in different embodiments.

The read-only-memory (ROM) 630 stores static data and instructions that are needed by the processing unit(s) 610 and other modules of the electronic system. The permanent storage device 635, on the other hand, is a read-and-write memory device. This device is a non-volatile memory unit that stores instructions and data even when the electronic system 600 is off. Some embodiments of the invention use a mass-storage device (such as a magnetic or optical disk and its corresponding disk drive) as the permanent storage device 635.

Other embodiments use a removable storage device (such as a floppy disk, flash drive, etc.) as the permanent storage device. Like the permanent storage device 635, the system memory 625 is a read-and-write memory device. However, unlike storage device 635, the system memory is a volatile read-and-write memory, such a random access memory. The system memory 625 stores some of the instructions and data that the processor needs at runtime. In some embodiments, the invention's processes are stored in the system memory 625, the permanent storage device 635, and/or the read-only memory 630. From these various memory units, the processing unit(s) 610 retrieve instructions to execute and data to process in order to execute the processes of some embodiments.

The bus 605 also connects to the input and output devices 640 and 645. The input devices 640 enable the user to communicate information and select commands to the electronic system. The input devices 640 include alphanumeric keyboards and pointing devices (also called "cursor control devices"). The output devices 645 display images generated by the electronic system 600. The output devices 645 include printers and display devices, such as cathode ray tubes (CRT) or liquid crystal displays (LCD). Some embodiments include devices such as a touchscreen that function as both input and output devices.

Finally, as shown in FIG. 6, bus 605 also couples electronic system 600 to a network 665 through a network adapter (not shown). In this manner, the computer can be a part of a network of computers (such as a local area network ("LAN"), a wide area network ("WAN"), or an Intranet, or a network of networks, such as the Internet. Any or all components of electronic system 600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, are non-VM DCNs that include a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method of forwarding packets through a software-defined wide area network (SD-WAN), the method comprising:
receiving a first packet of a flow at an ingress forwarding node of the SD-WAN;
after receiving the first packet, (i) generating a set of SD-WAN header (SDH) values for the flow, each SDH value specifying a network address for a subsequent forwarding node in the SD-WAN through which the flow should traverse to reach a destination outside of the SD-WAN and (ii) sending the generated set of SDH values to a next forwarding node in the SD-WAN for the next forwarding node and any other subsequent forwarding nodes to use to forward the flow through the SD-WAN without using any encapsulating tunnel header to direct traversal of the flow through the SD-WAN;
sending the first packet to the next forwarding node in the SD-WAN; and
sending, to the next forwarding node in the SD-WAN, subsequent packets of the flow without sending the set of SDH values again for the subsequent packets.

2. The method of claim 1, wherein the flow is a Transmission Control Protocol (TCP) flow, the method comprising performing a TCP split operation that comprises said generating and sending of the set of SDH values.

3. The method of claim 1 further comprising identifying a path through the SD-WAN based on header values of the first packet.

4. The method of claim 1 further comprising:
at each subsequent forwarding node in the SD-WAN, removing an SDH value that corresponds to the subsequent forwarding node from the set of SDH values and forwarding the remaining set of SDH values to a next subsequent forwarding node when there is a next subsequent forwarding node.

5. The method of claim 4, wherein when there is not a next subsequent forwarding node, forwarding the flow from the subsequent forwarding node to the destination outside the SD-WAN.

6. The method of claim 4, wherein the removed SDH value is a leading SDH value of the set of SDH values.

7. The method of claim 4 further comprising, at each of the subsequent forwarding nodes:
storing a set of rules based at least partly on the received set of SDH values, the set of rules associating the next subsequent forwarding node with the flow when there is a next subsequent forwarding node;
receiving the flow at the subsequent forwarding node; and
based on the set of rules, sending the flow to the next subsequent forwarding node.

8. The method of claim 4 further comprising, at each of the subsequent forwarding nodes:
splicing a pair of connections associated with the flow;
receiving the flow at the subsequent forwarding node through a first connection of the pair of connections; and
based on the splicing of the connections, forwarding the flow to the next subsequent forwarding node through the second connection when there is a next subsequent forwarding node.

9. The method of claim 8, wherein a first forwarding node is a next subsequent forwarding node of a second forwarding node, the method further comprising:
receiving a reply flow in response to the flow at the first forwarding node; and
based on the splicing of the pair of connections of the first forwarding node, forwarding the reply flow to the second forwarding node through the first connection of the first forwarding node.

10. The method of claim 1, wherein
sending the generated set of SDH values and sending the first packet to the next forwarding node in the SD-WAN comprises sending the generated set of SDH values with the first packet.

11. The method of claim 1, wherein the sets of instructions for sending the generated set of SDH values and sending the first packet to the next forwarding node in the SD-WAN comprises a set of instructions for sending the generated set of SDH values before sending the first packet.

12. A non-transitory machine readable medium storing a program which when executed by at least one processing unit forwards packets through a software-defined wide area network (SD-WAN), the program comprising sets of instructions for:
receiving a first packet of a flow at an ingress forwarding node of the SD-WAN;
after receiving the first packet, (i) generating, for the flow, a set of one or more SD-WAN next hop values that specifies a set of one or more network addresses for a set of one or more subsequent forwarding nodes in the SD-WAN through which the flow should traverse to reach a destination outside of the SD-WAN and (ii) sending the generated set of SDH values to a next forwarding node in the SD-WAN for the next forwarding node to use to forward the flow through the SD-WAN;
sending the first packet to the next forwarding node in the SD-WAN; and
sending, to the next forwarding node in the SD-WAN, subsequent packets of the flow without sending the set of SDH values again for the subsequent packets.

13. The non-transitory machine readable medium of claim 12, wherein the set of SDH values includes one next hop value specifying a network address of a subsequent forwarding node of the ingress forwarding node.

14. The non-transitory machine readable medium of claim 13, wherein each subsequent forwarding node:
determines a next hop value, specifying a network address of a next subsequent forwarding node, by using, for the first packet, a set of original header values of the flow to identify the next subsequent forwarding node; and
creates a connection tracking record for the flow that stores the network address of the next subsequent forwarding node.

15. The non-transitory machine readable medium of claim 14, wherein the connection tracking record associates a network address of the previous forwarding node with the network address of the next subsequent forwarding node.

16. The non-transitory machine readable medium of claim 15, wherein, for a second packet of the flow, at each of a plurality of subsequent forwarding nodes, the subsequent forwarding node uses the connection tracking record to identify the network address of the next subsequent forwarding node.

17. The non-transitory machine readable medium of claim 14, wherein each of the subsequent forwarding nodes:
splices a pair of connections associated with the flow using the connection tracking record;
receives the flow at the subsequent forwarding node through a first connection of the pair of connections; and
based on the splicing of the connections, forwards the flow to the next subsequent forwarding node through a second connection of the pair of connections when there is a next subsequent forwarding node.

18. The non-transitory machine readable medium of claim 17, wherein a first forwarding node is a next subsequent forwarding node of a second forwarding node, wherein the first forwarding node:
receives a reply flow in response to the flow at the first forwarding node; and
based on the splicing of the pair of connections of the first forwarding node, forwards the reply flow to the second forwarding node through the first connection of the first forwarding node.

19. The non-transitory machine readable medium of claim 12, wherein the set of one or more SD-WAN next hop values comprises two or more next hop values specifying all of the network addresses for the set of one or more subsequent forwarding nodes.

20. The non-transitory machine readable medium of claim 12, wherein the flow is a Transmission Control Protocol (TCP) flow.

21. The non-transitory machine readable medium of claim 12, wherein the sets of instructions for sending the generated set of SDH values and sending the first packet to the next forwarding node in the SD-WAN comprises a set of instructions for sending the generated set of SDH values with the first packet.

* * * * *